US012003975B2

(12) United States Patent
Yang et al.

(10) Patent No.: US 12,003,975 B2
(45) Date of Patent: Jun. 4, 2024

(54) CHANNEL STATE INFORMATION (CSI) MEASUREMENT AND REPORT FOR DYNAMIC SPECTRUM SHARING (DSS) IN A WIRELESS WIDE AREA NETWORK (WWAN)

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 17/463,386

(22) Filed: Aug. 31, 2021

(65) Prior Publication Data

US 2023/0063299 A1    Mar. 2, 2023

(51) Int. Cl.
| | | |
|---|---|---|
| *H04W 16/14* | (2009.01) | |
| *H04W 4/06* | (2009.01) | |
| *H04W 72/0446* | (2023.01) | |
| *H04W 72/1263* | (2023.01) | |
| *H04W 72/54* | (2023.01) | |

(52) U.S. Cl.
CPC ............ *H04W 16/14* (2013.01); *H04W 4/06* (2013.01); *H04W 72/0446* (2013.01); *H04W 72/1263* (2013.01); *H04W 72/54* (2023.01)

(58) Field of Classification Search
CPC ... H04W 16/14; H04W 4/06; H04W 72/0446; H04W 72/1263; H04W 72/54; H04B 7/0626
See application file for complete search history.

(56) References Cited

U.S. PATENT DOCUMENTS

| | | | | |
|---|---|---|---|---|
| 9,210,606 | B2 * | 12/2015 | Jung | .................... H04J 11/0023 |
| 2016/0204910 | A1 * | 7/2016 | Kim | ....................... H04B 7/024 |
| | | | | 370/252 |

FOREIGN PATENT DOCUMENTS

| | | | | |
|---|---|---|---|---|
| CA | 3028778 A1 | * | 6/2019 | ........... H04B 7/0617 |
| WO | WO-2022231488 A1 | * | 11/2022 | |

* cited by examiner

*Primary Examiner* — Nishant Divecha

(74) *Attorney, Agent, or Firm* — Holland & Hart LLP

(57) ABSTRACT

This disclosure provides systems, methods, and apparatus, including computer programs encoded on computer-readable media, for implementing a channel state information (CSI) measurement and reporting protocol for dynamic spectrum sharing (DSS) in a wireless communication network. In some aspects, a BS may transmit control messages periodically and aperiodically that configure a UE to perform signal quality measurements and transmit signal quality reports. When the UE receives a periodic control message, the UE may perform signal quality measurements on both a multimedia broadcast single frequency network (MBSFN) subframe and a non-MBSFN subframe of a frame received from the BS. When the UE receives an aperiodic control message, the UE may perform a signal quality measurement on either a MBSFN subframe or a non-MBSFN subframe. The UE may generate and transmit signal quality reports to the BS periodically and aperiodically corresponding to the received periodic and aperiodic control messages, respectively.

30 Claims, 11 Drawing Sheets

CHANNEL STATE INFORMATION (CSI) MEASUREMENT AND REPORT FOR DYNAMIC SPECTRUM SHARING (DSS) IN A WIRELESS WIDE AREA NETWORK (WWAN)

TECHNICAL FIELD

Aspects of the present disclosure relate generally to wireless communication and to techniques for implementing a channel state information (CSI) measurement and report for dynamic spectrum sharing (DSS) in a wireless wide area network (WWAN).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the $3^{rd}$ generation (3G) and $4^{th}$ generation (4G, including long term evolution (LTE)) technologies to a next generation new radio (NR) technology, which may be referred to as $5^{th}$ Generation (5G) or 5G NR. For example, NR is designed to provide a lower latency, a higher bandwidth or a higher throughput, and a higher reliability than 3G or LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave (mmW)) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Wireless communication networks may support some combination of 2G, 3G, LTE, and 5G NR technologies. A UE may communicate with the wireless communication network using one or more of the 2G, 3G, LTE, and 5G NR technologies. For example, the UE may use 5G NR for some applications, such as data transmissions, and may use LTE for other applications, such as voice transmissions. A UE also may have access to wireless local area networks (WLANs) in the wireless communication network.

SUMMARY

The systems, methods, and devices of this disclosure each have several innovative aspects, no single one of which is solely responsible for the desirable attributes disclosed herein.

One aspect of the subject matter described in this disclosure can be implemented in a method for DSS in a WWAN performed by a first node. The method may include performing a first signal quality measurement associated with an MBSFN subframe of a frame received from a second node, performing a second signal quality measurement associated with a non-MBSFN subframe of the frame, and transmitting a first signal quality report associated with at least one of the first signal quality measurement and the second signal quality measurement to the second node.

In some implementations, the first signal quality report may be a CSI report, and the method for performing the first signal quality measurement associated with the MBSFN subframe may include performing the first signal quality measurement on CSI included in the MBSFN subframe, or performing the first signal quality measurement on data included in the MBSFN subframe.

In some implementations, the method for performing the second signal quality measurement associated with the non-MBSFN subframe may include performing the second signal quality measurement on CSI included in the non-MBSFN subframe, or performing the second signal quality measurement on data included in the non-MBSFN subframe.

In some implementations, the method for transmitting the first signal quality report associated with at least one of the first signal quality measurement and the second signal quality measurement may include transmitting the first signal quality report that includes a third signal quality measurement that is calculated using the first signal quality measurement and the second signal quality measurement.

In some implementations, the method may further include generating the first signal quality report using the first signal quality measurement, and generating a second signal quality report using the second signal quality measurement. The first signal quality report may indicate the first signal quality measurement associated with the MBSFN subframe and the second signal quality report may indicate the second signal quality measurement associated with the non-MBSFN subframe. The method may further include transmitting the second signal quality report to the second node.

Another aspect of the subject matter described in this disclosure can be implemented in a method for DSS in a WWAN performed by a first node. The method may include receiving a CSI request message from a second node, the CSI request message indicating CSI will be transmitted by the second node in either an MBSFN subframe or a non-MBSFN subframe of a frame. The method may include performing a signal quality measurement on the CSI included in the MBSFN subframe associated with the CSI request message indicating that the CSI will be transmitted in the MBSFN subframe, performing the signal quality measurement on the CSI included in the non-MBSFN subframe associated with the CSI request message indicating that the CSI will be transmitted in the non-MBSFN subframe, and transmitting a signal quality report to the second node, the signal quality report including the signal quality measurement.

Another aspect of the subject matter described in this disclosure can be implemented in a method for DSS in a WWAN performed by a first node. The method may include transmitting a control message to a second node that indicates CSI will be provided to the second node in either an MBSFN subframe or a non-MBSFN subframe of a frame, and receiving a first signal quality report from the second node, the first signal quality report indicating a first signal quality measurement associated with at least one of the MBSFN subframe and the non-MBSFN subframe. The method may include scheduling a data transmission in at least one of the MBSFN subframe and the non-MBSFN subframe. The scheduling may be associated with the first signal quality measurement.

In some implementations, the method for receiving the first signal quality report indicating the first signal quality measurement associated with at least one of the MBSFN subframe and the non-MBSFN subframe may include receiving the first signal quality report indicating the first signal quality measurement that is calculated using a second signal quality measurement associated with the MBSFN subframe and a third signal quality measurement associated with the non-MBSFN subframe.

In some implementations, the first signal quality measurement may be associated with the MBSFN subframe, and the method may further include receiving a second signal quality report from the second node. The second signal quality report may indicate a second signal quality measurement associated with the non-MBSFN subframe.

Another aspect of the subject matter described in this disclosure can be implemented in an apparatus of a first node configured to implement DSS in a WWAN. The apparatus may include one or more processors and one or more interfaces. The one or more processors may be configured to perform a first signal quality measurement associated with a MBSFN subframe of a frame received from a second node, and perform a second signal quality measurement associated with a non-MBSFN subframe of the frame. The one or more interfaces may be configured to transmit a first signal quality report associated with at least one of the first signal quality measurement and the second signal quality measurement to the second node.

Another aspect of the subject matter described in this disclosure can be implemented in an apparatus of a first node configured to implement DSS in a WWAN. The apparatus may include one or more processors and one or more interfaces. The one or more interfaces may be configured to receive a CSI request message from a second node. The CSI request message may indicate CSI will be transmitted by the second node in either a MBSFN subframe or a non-MBSFN subframe of a frame. The one or more processors may be configured to perform a signal quality measurement on the CSI included in the MBSFN subframe associated with the CSI request message indicating that the CSI will be transmitted in the MBSFN subframe, and perform the signal quality measurement on the CSI included in the non-MBSFN subframe associated with the CSI request message indicating that the CSI will be transmitted in the non-MBSFN subframe. The one or more interfaces may be configured to transmit a signal quality report to the second node, the signal quality report including the signal quality measurement.

Another aspect of the subject matter described in this disclosure can be implemented in an apparatus of a first node configured to implement DSS in a WWAN. The apparatus may include one or more processors and one or more interfaces. The one or more interfaces may be configured to transmit a control message to a second node that indicates CSI will be provided to the second node in either a MBSFN subframe or a non-MBSFN subframe of a frame, and receive a first signal quality report from the second node. The first signal quality report may indicate a first signal quality measurement associated with at least one of the MBSFN subframe and the non-MBSFN subframe. The one or more processors may be configured to schedule a data transmission in at least one of the MBSFN subframe and the non-MBSFN subframe, the schedule of the data transmission being associated with the first signal quality measurement.

Aspects of the subject matter described in this disclosure can be implemented in a device, a software program, a system, or other means to perform any of the above-mentioned methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
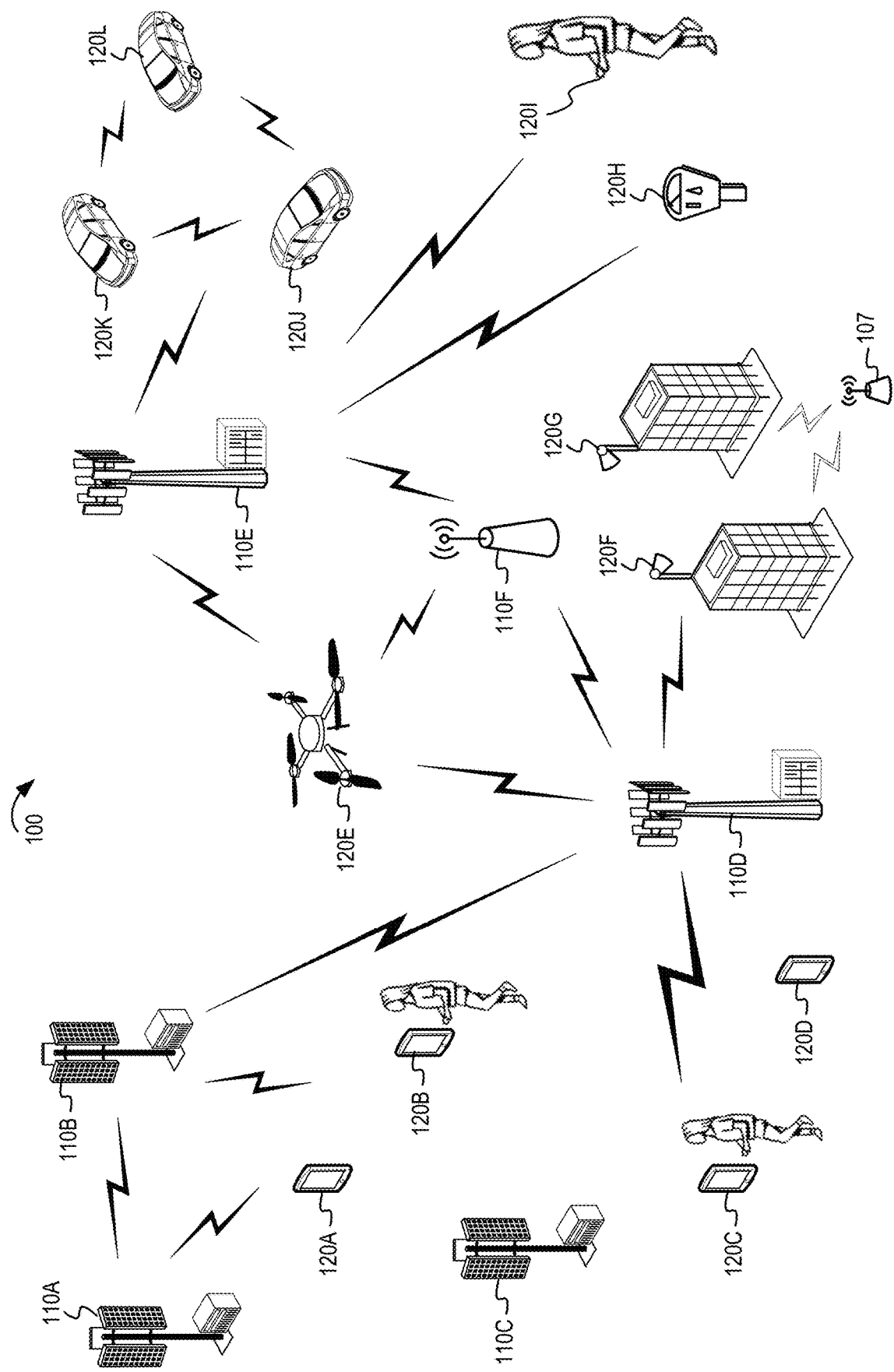
FIG. 1 is a system diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless network communications in wide area networks (WANs). However, the described implementations may be implemented in any device, system or network that is capable of transmitting and receiving radio frequency signals according to any of the wireless communication standards, including any of the Institute of Electrical and Electronics Engineers (IEEE) 802.11 standards, the Bluetooth® standard, code division multiple access (CDMA), time division multiple access (TDMA), frequency division multiple access (FDMA), orthogonal FDMA (OFDMA), single-carrier FDMA (SC-FDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), $5^{th}$ Generation (5G) or new radio (NR), Advanced Mobile Phone Service (AMPS), or other known signals that are used to communicate within a wireless, cellular or internet of things (IoT) network, such as a system utilizing 3G, 4G or 5G, or further implementations thereof, technology.

A wireless communication network (which also may be referred to as a wireless WAN or WWAN) may include base stations (BSs) that implement a 5G NR radio access technology (RAT) of a 5G NR network and BSs that implement an LTE RAT of an LTE network. The RATs of a WWAN also may be referred to as WWAN RATs. A user equipment (UE) of the wireless communication network may use the 5G NR RAT or the LTE RAT depending on which wireless coverage is available to the UE and which wireless coverage provides the best quality service.

A WWAN may include 5G BSs and LTE BSs that may have a Multi-Radio Dual Connectivity (MR-DC) architecture or a standalone (SA) architecture. The BSs having the MR-DC architecture may operate in an MR-DC mode, which may be an Evolved Universal Terrestrial Radio Access (E-UTRA) NR Dual Connectivity (EN-DC) mode. The BSs also may implement dynamic spectrum sharing (DSS) between the 5G NR RAT and the LTE RAT. For example, a 5G NR BS and an LTE BS having an EN-DC architecture may implement DSS in a WWAN.

In some aspects, when the 5G NR and LTE BSs implement DSS, the BSs transmit frames that include multimedia broadcast single frequency network (MBSFN) subframes and non-MBSFN subframes to the UEs. The BSs may transmit channel station information (CSI) in either a MBSFN subframe or a non-MBSFN subframe of a frame. The CSI may include a CSI reference signal (CSI-RS), or a CSI Interference Measurement (CSI-IM), or both. The CSI is typically not included in both the MBSFN subframe and the non-MBSFN subframe in order to reduce overhead. When a UE receives the frame, the UE may perform signal quality measurements on either the MBSFN subframe or the non-MBSFN subframe of the frame. If the CSI was included in the MBSFN subframe, the UE may perform the signal quality measurements on the MBSFN subframe of the frame. If the CSI was included in the non-MBSFN subframe, the UE may perform the signal quality measurement on the non-MBSFN subframe of the frame.

The transmission of non-MBSFN subframe is typically affected by much higher interference than the transmission of the MBSFN subframe. For example, the non-MBSFN subframe may affected by cell reference signal (CRS) interference, physical downlink shared channel (PDSCH) interference, or both. The MBSFN subframe is typically not affected by this type of interference. Thus, when the CSI is included in the MBSFN subframe and the UE measures the signal quality of the MBSFN subframe, the signal quality measurement is typically high, which is indicative of a high quality signal. After receiving a signal quality report from the UE, a BS may schedule a data transmission in either a MBSFN subframe or a non-MBSFN subframe using the signal quality measurement associated with the MBSFN subframe. If the BS schedules the data transmission in a non-MBSFN subframe using the signal quality measurement derived from the MBSFN subframe having less interference, the block error rate (BLER) may be high and may result in one or more transmission errors.

When the CSI is included in the non-MBSFN subframe and the UE measures the signal quality of the non-MBSFN subframe, the signal quality measurement is typically lower than the signal quality measurement associated with the MBSFN subframe, which is indicative of a lower quality signal. After receiving a signal quality report from the UE, a BS may schedule a data transmission in either a MBSFN subframe or a non-MBSFN subframe using the signal quality measurement associated with the non-MBSFN subframe. If the BS schedules the data transmission in an MBSFN subframe using the signal quality measurement derived from the non-MBSFN subframe having more interference, the spectrum efficiency associated with the data transmission will be negatively affected.

In some implementations, a UE may perform signal quality measurements on both an MBSFN subframe and a non-MBSFN subframe of a frame received from a BS. After the BS receives a signal quality report from the UE, the BS may schedule data transmissions on the MBSFN subframe using the signal quality measurement associated with the MBSFN subframe, and may schedule data transmissions on the non-MBSFN subframe using the signal quality measurement associated with the non-MBSFN subframe. Furthermore, a BS may provide control messages to the UE to configure the UE to perform signal quality measurements periodically or aperiodically, or both.

In some implementations, a BS may provide a control message to the UE to perform signal quality measurements periodically that also indicates whether the CSI will be provided to the UE in a MBSFN subframe or in a non-MBSFN subframes. The control message may be an RRC message or an RRC reconfiguration message. The UE may perform a first signal quality measurement on the MBSFN subframe and perform a second signal quality measurement on the non-MBSFN subframe. In some implementations, the UE may generate and transmit one or more signal quality reports (which may be referred to as periodic signal quality reports) associated with the first signal quality measurements or the second signal quality measurements or both. For example, the UE may transmit a signal quality report associated with a third signal quality measurement that is associated with the first signal quality measurements and the second signal quality measurements. As another example, the UE may transmit a first signal quality report associated with the first signal quality measurement and may transmit a second signal quality report associated with the second signal quality measurement. In some implementations, the BS may receive a signal quality report and schedule data transmissions in the MBSFN subframe or the non-MBSFN subframe, or both, using the third signal quality measurement. In some implementations, the BS may receive the first and second signal quality reports and schedule data transmissions in the MBSFN subframe using the first signal quality measurement or schedule data transmissions in the non-MBSFN subframe using the second signal quality measurement, or schedule data transmissions in both the MBSFN subframe and the non-MBSFN subframe, as described further herein.

In some implementations, a BS may provide a control message to the UE to perform signal quality measurements aperiodically that also indicates whether the CSI will be provided to the UE in a MBSFN subframe or in a non-MBSFN subframes. The control message may be an aperiodic report request message, such as an aperiodic CSI (A-CSI) request message or a physical downlink control channel (PDCCH) A-CSI request message. The UE may perform a signal quality measurement on either the MBSFN subframe or the non-MBSFN subframe, depending on which subframe includes the CSI. In some implementations, the UE may generate and transmit a signal quality reports (which may be referred to as an aperiodic signal quality report) associated with the signal quality measurement. In some implementations, the BS may receive the signal quality report and schedule data transmissions in the MBSFN subframe or the non-MBSFN subframe or both using the signal quality measurement.

Particular implementations of the subject matter described in this disclosure can be implemented to realize one or more of the following potential advantages. Performing signal quality measurements on both the MBSFN and non-MBSFN subframes that are affected by different levels of interference may provide the signal quality for each of the MBSFN and non-MBSFN subframes periodically. Knowing the signal quality measurements for each of the MBSFN and non-MBSFN subframes may allow a BS to customize the configuration of data transmission and effectively schedule data transmissions in both the MBSFN and non-MBSFN subframes depending on the corresponding signal quality. Furthermore, implementing aperiodic signaling that indicates whether the CSI will be included in an MBSFN subframe or a non-MBSFN subframe also may allow the BS to effectively schedule data transmissions associated with the aperiodic signaling. Therefore, knowing the signal quality measurements for each of the MBSFN and non-MBSFN subframes may reduce data transmission errors (and data retransmissions), reduce latency due to the reduced number of retransmissions, improve spectrum efficiency, and thus reduce overhead and improve DSS throughput, which may improve the overall performance of the WWAN and the user experience.

FIG. 1 is a system diagram of an example wireless communication network 100. The wireless communication network 100 may be an LTE network or a 5G NR network, or a combination thereof. The wireless communication network 100 also may be referred to as a wide area network (WAN) or a wireless wide area network (WWAN). The wireless communication network 100 includes a number of base stations (BSs) 110 (individually labeled as 110A, 110B, 110C, 110D, 110E, and 110F) and other network entities. A BS 110 may be a station that communicates with UEs 120 and also may be referred to as an evolved node B (eNB), a next generation eNB (gNB), an access point, and the like. In some implementations, a BS 110 may represent an eNB of an LTE network or a gNB of a 5G NR network, or a combination thereof. Each BS 110 may provide communication coverage for a particular geographic area. In 3GPP, the term "cell" can refer to this particular geographic coverage area of a BS 110 or a BS subsystem serving the coverage area, depending on the context in which the term is used.

A BS 110 may provide communication coverage for a macro cell or a small cell, such as a pico cell or a femto cell, or other types of cells. A macro cell generally covers a relatively large geographic area (such as several kilometers in radius) and may allow unrestricted access by UEs with service subscriptions with the network provider. A pico cell generally covers a relatively smaller geographic area and may allow unrestricted access by UEs with service subscriptions with the network provider. A femto cell generally covers a relatively small geographic area (such as a home) and, in addition to unrestricted access, also may provide restricted access by UEs having an association with the femto cell (such as UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110D and 110E may be regular macro BSs, while the BSs 110A-110C may be macro BSs enabled with three dimensions (3D), full dimensions (FD), or massive MIMO. The BSs 110A-110C may take advantage of their higher dimension MIMO capabilities to exploit 3D beamforming in both elevation and azimuth beamforming to increase coverage and capacity. The BS 110F may be a small cell BS which may be a home node or portable access point. A BS 110 may support one or multiple (such as two, three, four, and the like) cells.

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless communication network 100, and each UE 120 may be stationary or mobile. A UE 120 also may be referred to as a terminal, a mobile station, a wireless device, a subscriber unit, a station, or the like. A UE 120 may be a mobile phone, a personal digital assistant (PDA), a wireless modem, a wireless communication device, a handheld device, a wearable device, a tablet computer, a laptop computer, a cordless phone, a wireless local loop (WLL) station, a smart appliance, a drone, a video camera, a sensor, or the like. In one aspect, a UE 120 may be a device that includes a Universal Integrated Circuit Card (UICC). In another aspect, a UE may be a device that does not include a UICC. In some aspects, the UEs 120 that do not include UICCs also may be referred to as IoT devices or internet of everything (IoE) devices. The UEs 120A-120D are examples of mobile smart phone-type devices that may access the wireless communication network 100. A UE 120 also may be a machine specifically configured for connected communication, including machine type communication (MTC), enhanced MTC (eMTC), narrowband IoT (NB-IoT), and the like. The UEs 120E-120L are examples of various machines configured for communication that access the wireless communication network 100. A UE 120 may be able to communicate with any type of the BSs, whether macro BS, small cell, or the like. In FIG. 1, a lightning bolt is representative of a communication link that indicates wireless transmissions between a UE 120 and a serving BS 110, which is a BS designated to serve the UE 120 on the downlink and uplink, or desired transmission between BSs, and backhaul transmissions between BSs.

In operation, the BSs 110A-110C may serve the UEs 120A and 120B using 3D beamforming and coordinated spatial techniques, such as coordinated multipoint (CoMP) or multi-connectivity. The macro BS 110D may perform backhaul communications with the BSs 110A-110C, as well as the BS 110F (which may be a small cell BS). The macro BS 110D also may transmit multicast services which are subscribed to and received by the UEs 120C and 120D. Such multicast services may include mobile television or stream video, or may include other services for providing community information, such as weather emergencies or alerts, such as Amber alerts or gray alerts.

The BSs 110 also may communicate with a core network. The core network may provide user authentication, access authorization, tracking, Internet Protocol (IP) connectivity, and other access, routing, or mobility functions. At least some of the BSs 110 (such as a gNB or an access node controller (ANC)) may interface with the core network through backhaul links (such as NG-C and NG-U) and may perform radio configuration and scheduling for communication with the UEs 120. In various examples, the BSs 110 may communicate, either directly or indirectly (such as through core network), with each other over backhaul links, which may be wired or wireless communication links.

The wireless communication network 100 also may support mission critical communications with ultra-reliable and redundant links for mission critical devices, such as the UE 120E, which may be a drone. Redundant communication links with the UE 120E may include links from the macro BSs 110D and 110E, as well as links from the small cell BS 110F. Other machine type devices, such as the UE 120F and UE 120G (such as video cameras or smart lighting), the UE 120H (such as a smart meter), and UE 120I (such as a wearable device) may communicate through the wireless communication network 100 either directly with the BSs, such as the small cell BS 110F, and the macro BS 110E, or in multi-hop configurations by communicating with another user device which relays its information to the wireless communication network 100. For example, the UE 120H may communicate smart meter information to the UE 120I (such as a wearable device or mobile phone), which may report to the wireless communication network 100 through the small cell BS 110F. The wireless communication network 100 also may provide additional network efficiency through dynamic, low-latency TDD/FDD communications, such as in vehicle-to-vehicle (V2V) communications, as shown by UEs 120J-120L.

Furthermore, the wireless communication network 100 may include one or more access points (APs) 107 that are part of one or more wireless local area networks (WLANs). The APs 107 (which also may be referred to as WLAN APs) may provide short-range wireless connectivity to the UEs 120 of the wireless communication network 100.

In some implementations, the wireless communication network 100 may utilize OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW also may be partitioned into subbands. In other instances, the subcarrier spacing and/or the duration of TTIs may be scalable.

The BSs 110 may assign or schedule transmission resources (such as in the form of time-frequency resource blocks (RB)) for downlink (DL) and uplink (UL) transmissions in the wireless communication network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (such as the DL subframes) in a radio frame may be used for DL transmissions, and another subset of the subframes (such as the UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 110 and the UEs 120. For example, a reference signal can have a particular pilot pattern or structure, where pilot tones may span across an operational BW or frequency band, each positioned at a pre-defined time and a pre-defined frequency. For example, a BS 110 may transmit cell-specific reference signals (CRSs) or channel state information reference signals (CSI-RSs) to enable a UE 120 to estimate a DL channel. Similarly, a UE 120 may transmit sounding reference signals (SRSs) to enable a BS 110 to estimate a UL channel. Control information may include resource assignments and protocol controls. Data may include protocol data and operational data. In some aspects, the BSs 110 and the UEs 120 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the wireless communication network 100 may be an NR network deployed over a licensed spectrum or an NR network deployed over an unlicensed spectrum (such as NR-U and NR-U lite networks). The BSs 110 can transmit synchronization signals, including a primary synchronization signal (PSS) and a secondary synchronization signal (SSS), in the wireless communication network 100 to facilitate synchronization. The BSs 110 can broadcast system information associated with the wireless communication network 100 (such as a master information block (MIB), remaining system information (RMSI), and other system information (OSI)) to facilitate initial network access. In some instances, the BSs 110 may broadcast one or more of the PSS, the SSS, and the MIB in the form of synchronization signal block (SSBs) over a physical broadcast channel (PBCH) and may broadcast one or more of the RMSI and the OSI over a physical downlink shared channel (PDSCH).

In some aspects, a UE 120 attempting to access the wireless communication network 100 may perform an initial cell search by detecting a PSS included in an SSB from a BS 110. The PSS may enable synchronization of period timing and may indicate a physical layer identity value. The UE 120 may receive an SSS included in an SSB from the BS 110. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 120 may receive an MIB. The MIB may include system information for initial network access and scheduling information for at least one of an RMSI and OSI. After decoding the MIB, the UE 120 may receive at least one of an RMSI and OSI. The RMSI and OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining one or more of the MIB, the RMSI and the OSI, the UE 120 can perform a random access procedure to establish a connection with the BS 110. In some examples, the random access procedure may be a four-step random access procedure. For example, the UE 120 may transmit a physical random access channel (PRACH), such as a PRACH preamble, and the BS 110 may respond with a random access response (RAR). The RAR may include one or more of a detected random access preamble identifier (ID) corresponding to the PRACH preamble, timing advance (TA) information, a UL grant, a temporary cell-radio network temporary identifier (C-RNTI), and a backoff indicator. Upon receiving the RAR, the UE 120 may transmit a connection request to the BS 110 and the BS 110 may respond with a connection response. The connection response may indicate a contention resolution. In some examples, the PRACH, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a PRACH (including a PRACH preamble) and a connection request in a single transmission and the BS 110 may respond by transmitting a RAR and a connection response in a single transmission.

After establishing a connection, the UE 120 and the BS 110 can enter a normal operation stage, where operational data may be exchanged. For example, the BS 110 may schedule the UE 120 for UL and DL communications. The BS 110 may transmit UL and DL scheduling grants to the UE 120 via a PDCCH. The BS 110 may transmit a DL communication signal to the UE 120 via a PDSCH according to a DL scheduling grant. The UE 120 may transmit a UL communication signal to the BS 110 via a PUSCH or PUCCH according to a UL scheduling grant.

In some aspects, the wireless communication network 100 may operate over a system BW or a component carrier BW. The wireless communication network 100 may partition the system BW into multiple bandwidth parts (BWPs). A BWP may be a certain portion of the system BW. For example, if the system BW is 100 MHz, the BWPs may each be 20 MHz or less. A BS 110 may dynamically assign a UE 120 to operate over a certain BWP. The assigned BWP may be referred to as the active BWP. The UE 120 may monitor the active BWP for signaling information from the BS 110. The BS 110 may schedule the UE 120 for UL or DL communications in the active BWP. In some implementations, the BS 110 may configure UEs 120 with narrowband operation capabilities (such as with transmission and reception limited to a BW of 20 MHz or less) to perform BWP hopping for channel monitoring and communications.

In some aspects, a BS 110 may assign a pair of BWPs within the component carrier to a UE 120 for UL and DL communications. For example, the BWP pair may include one BWP for UL communications and one BWP for DL communications. The BS 110 may additionally configure the UE 120 with one or more CORESETs in a BWP. A CORESET may include a set of frequency resources spanning a number of symbols in time. The BS 110 may configure the UE 120 with one or more search spaces for PDCCH monitoring based on the CORESETS. The UE 120 may perform blind decoding in the search spaces to search for DL control information (such as UL or DL scheduling grants) from the BS 110. For example, the BS 110 may configure the UE 120 with one or more of the BWPs, the CORESETS, and the PDCCH search spaces via RRC configurations.

In some aspects, the wireless communication network 100 may operate over a shared frequency band or an unlicensed frequency band, for example, at about 3.5 gigahertz (GHz), sub-6 GHz or higher frequencies in the mmWave band. The wireless communication network 100 may partition a frequency band into multiple channels, for example, each occupying about 20 MHz. The BSs 110 and the UEs 120 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT also may be referred to as a transmission opportunity (TXOP). The BS 110 or the UE 120 may perform an LBT in the frequency band prior to transmitting in the frequency band. The LBT can be based on energy detection or signal detection. For energy detection, the BS 110 or the UE 120 may determine that the channel is busy or occupied when a signal energy measured from the channel is greater than a certain signal energy threshold. For signal detection, the BS 110 or the UE 120 may determine that the channel is busy or occupied when a certain reservation signal (such as a preamble signal sequence) is detected in the channel.

Figure 2:
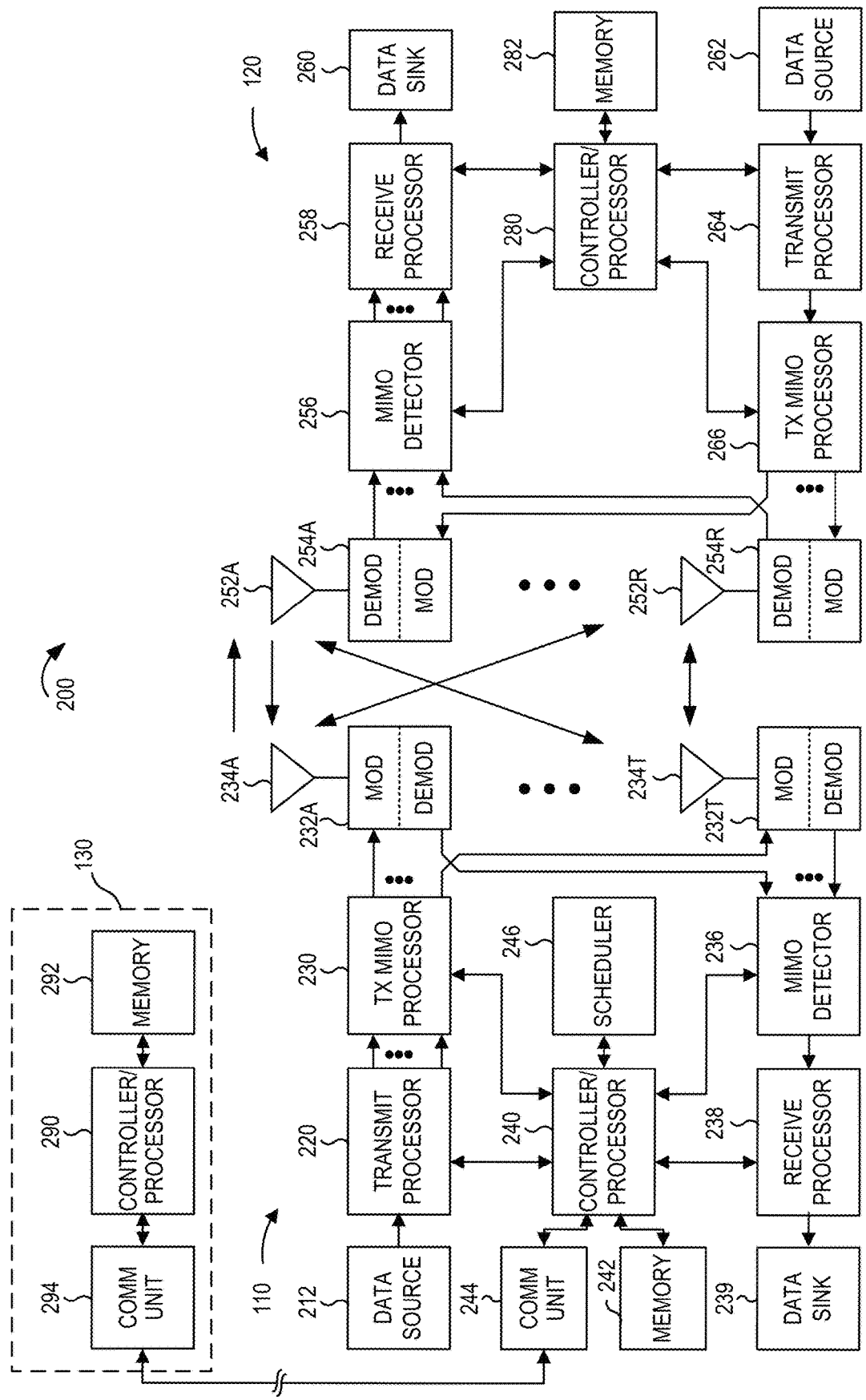
FIG. 2 is a block diagram conceptually illustrating an example of a base station (BS) in communication with a user equipment (UE).

FIG. 2 is a block diagram conceptually illustrating an example 200 of a BS 110 in communication with a UE 120. In some aspects, BS 110 and UE 120 may respectively be one of the BSs and one of the UEs in wireless communication network 100 of FIG. 1. BS 110 may be equipped with T antennas 234A through 234T, and UE 120 may be equipped with R antennas 252A through 252R, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators-demodulators (MODs-DEMODs) 232A through 232T (which also may be referred to as mods/demods or modems). Each MOD-DEMOD 232 may process a respective output symbol stream (for example, for OFDM, etc.) to obtain an output sample stream. Each MOD-DEMOD 232 may further process (for example, convert to analog, amplify, filter, and upconvert) the output sample stream to obtain a downlink signal. T downlink signals from MODs-DEMODs 232A through 232T may be transmitted via T antennas 234A through 234T, respectively. According to various aspects described in more detail below, the synchronization signals can be generated with location encoding to convey additional information.

At UE 120, antennas 252A through 252R may receive the downlink signals from BS 110 or other BSs and may provide received signals to modulators-demodulators (MODs-DEMODs) 254A through 254R, respectively (which also may be referred to as mods/demods or modems). Each MOD-DEMOD 254 may condition (for example, filter, amplify, downconvert, and digitize) a received signal to obtain input samples. Each MOD-DEMOD 254 may further process the input samples (for example, for OFDM, etc.) to obtain received symbols. A MIMO detector 256 may obtain received symbols from all R MODs-DEMODs 254A through 254R, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by MODs-DEMODs 254A through 254R (for example, for DFT-s-OFDM, CP-OFDM, etc.), and transmitted to BS 110. At BS 110, the uplink signals from UE 120 and other UEs may be received by antennas 234, processed by MOD-DEMOD 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The BS 110 may include communication unit 244 and may communicate to network controller 130 via communication unit 244. The network controller 130 may include communication unit 294, a controller or processor (i.e., controller/processor) 290, and memory 292.

The controller/processor 240 of BS 110, the controller/processor 280 of UE 120, or any other component(s) of FIG. 2 may perform one or more techniques associated with implementing signaling for differentiation of FD traffic scheduling combinations, as described in more detail elsewhere herein. For example, the controller/processor 240 of BS 110, the controller/processor 280 of UE 120, or any other component(s) (or combinations of components) of FIG. 2 may perform or direct operations of, for example, the process depicted by flowchart 700 of FIG. 7, the process depicted by flowchart 800 of FIG. 8, the process depicted by flowchart 900 of FIG. 9 or other processes as described herein, such as the processes described in FIGS. 3-6. The memories 242 and 282 may store data and program codes for BS 110 and UE 120, respectively. A scheduler 246 may schedule UEs for data transmission on the downlink, the uplink, or a combination thereof.

Figure 5:
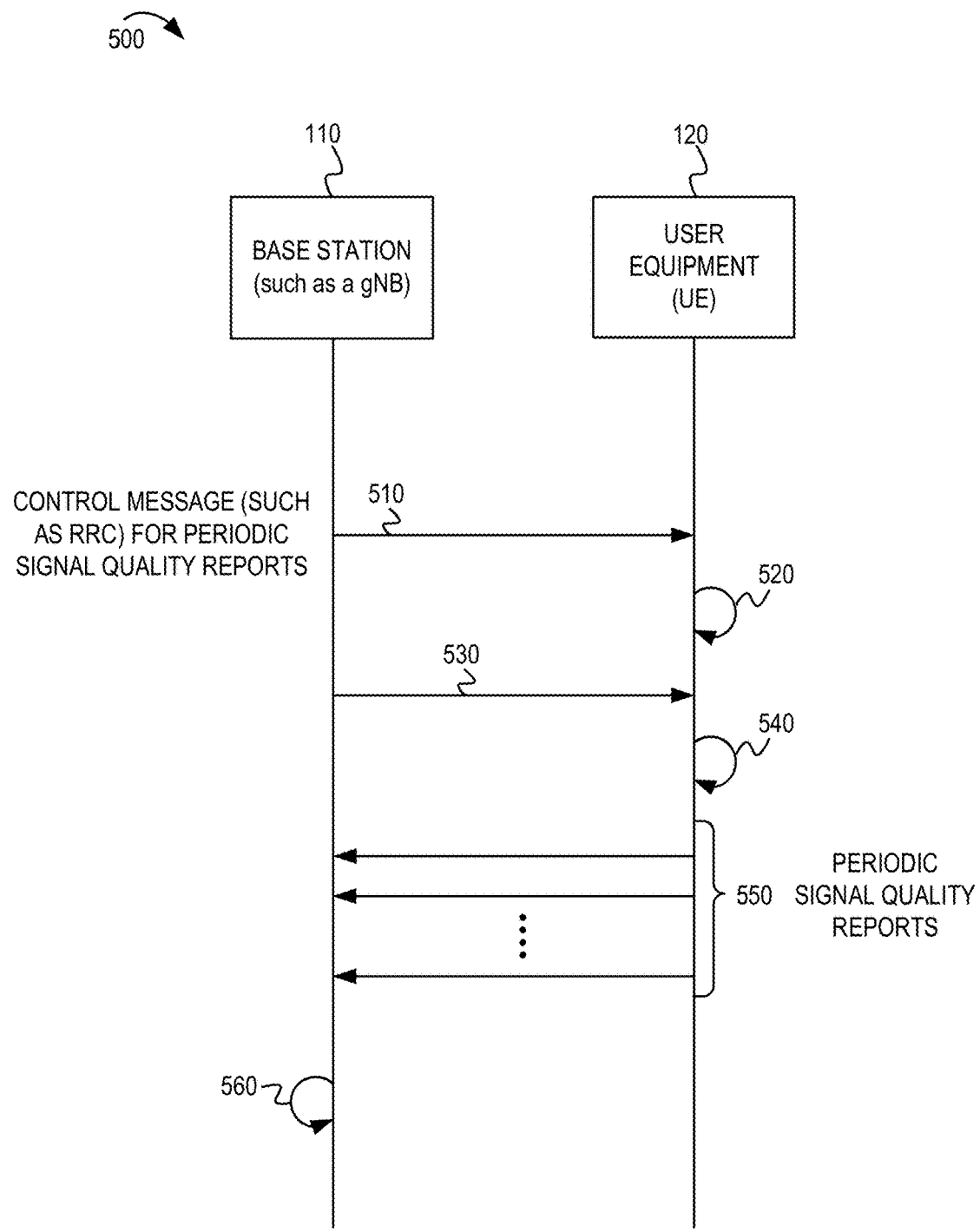
FIG. 5 shows an example message flow that shows periodic signaling from a BS to a UE to implement a CSI measurement and reporting protocol for DSS in a wireless communication network.
Figure 6:
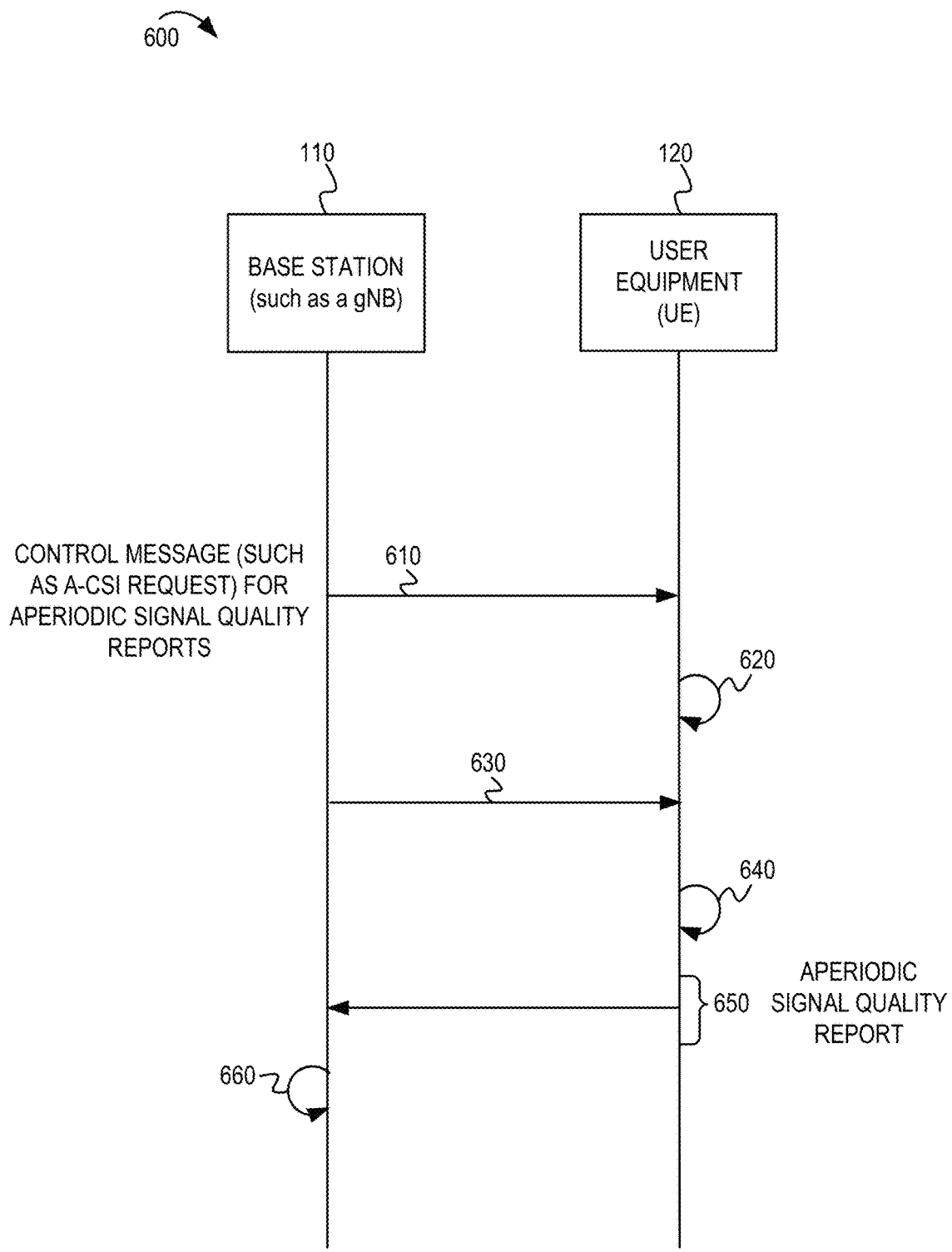
FIG. 6 shows an example message flow that shows aperiodic signaling from a BS to a UE to implement a CSI measurement and reporting protocol for DSS in a wireless communication network.
Figure 7:
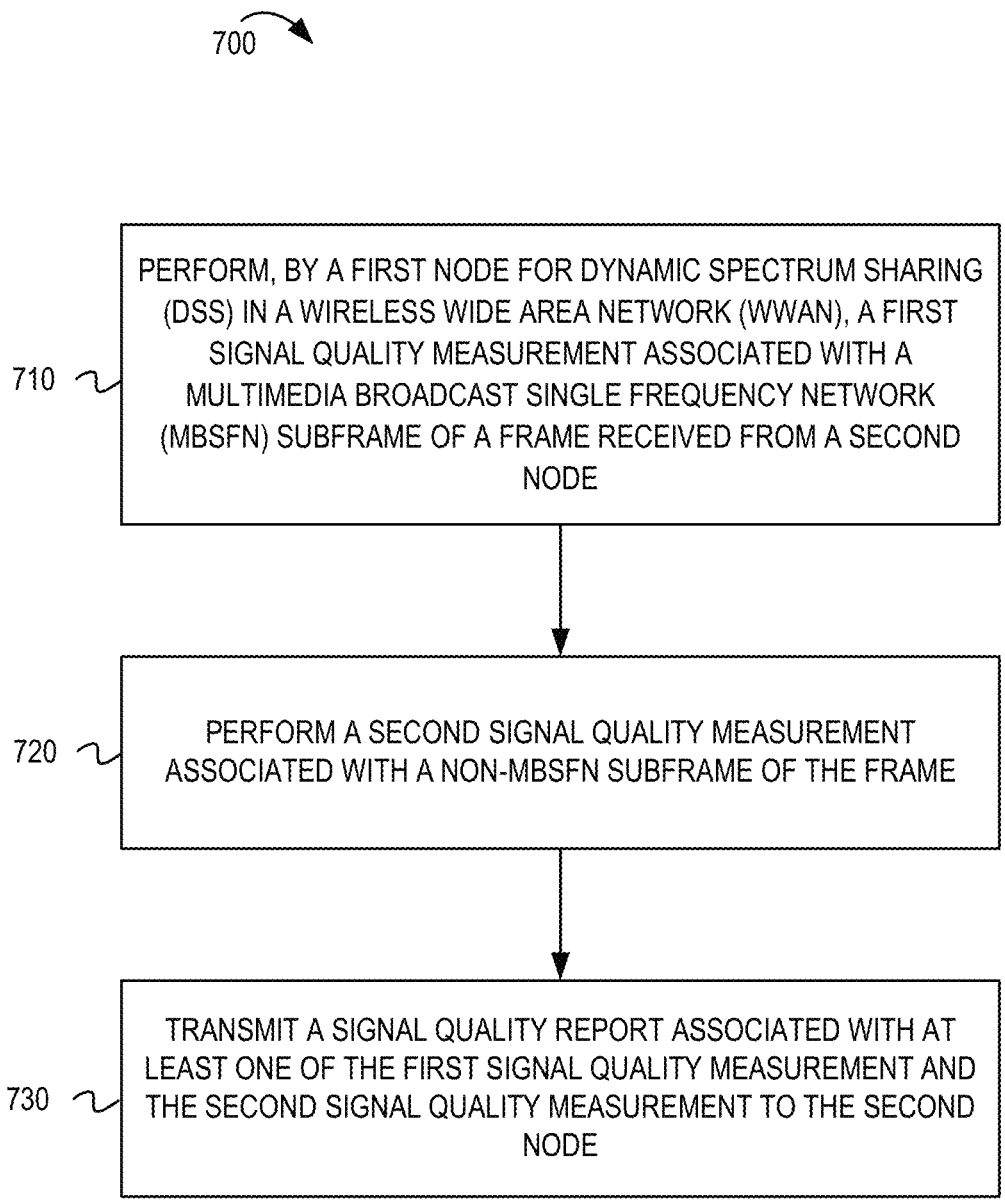
FIG. 7 depicts a flowchart with example operations performed by a first node of a wireless communication network for implementing a CSI measurement and reporting protocol for DSS in a wireless communication network.
Figure 8:
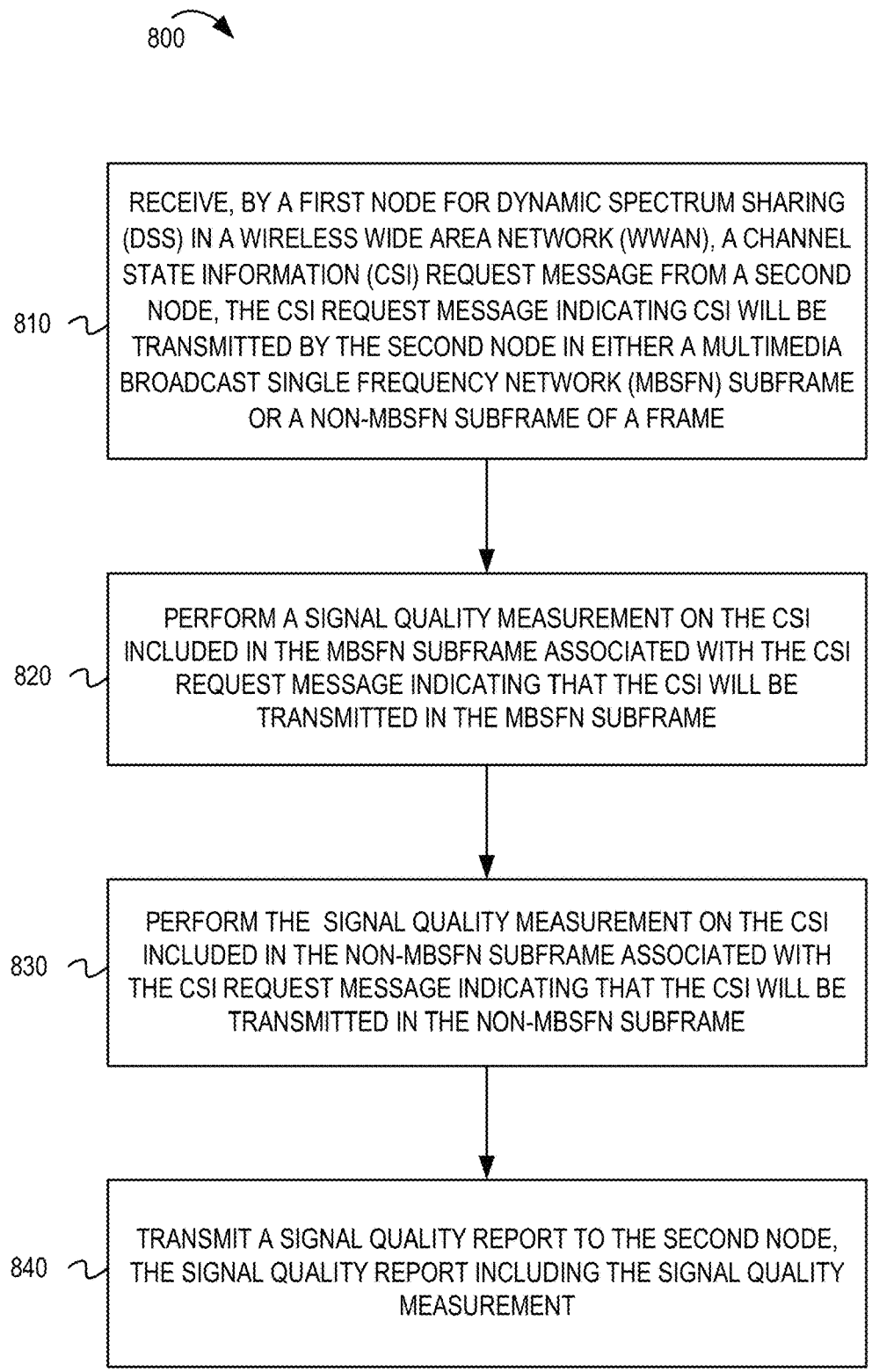
FIG. 8 depicts a flowchart with example operations performed by a first node of a wireless communication network for implementing a CSI measurement and reporting protocol for DSS in a wireless communication network.
Figure 9:
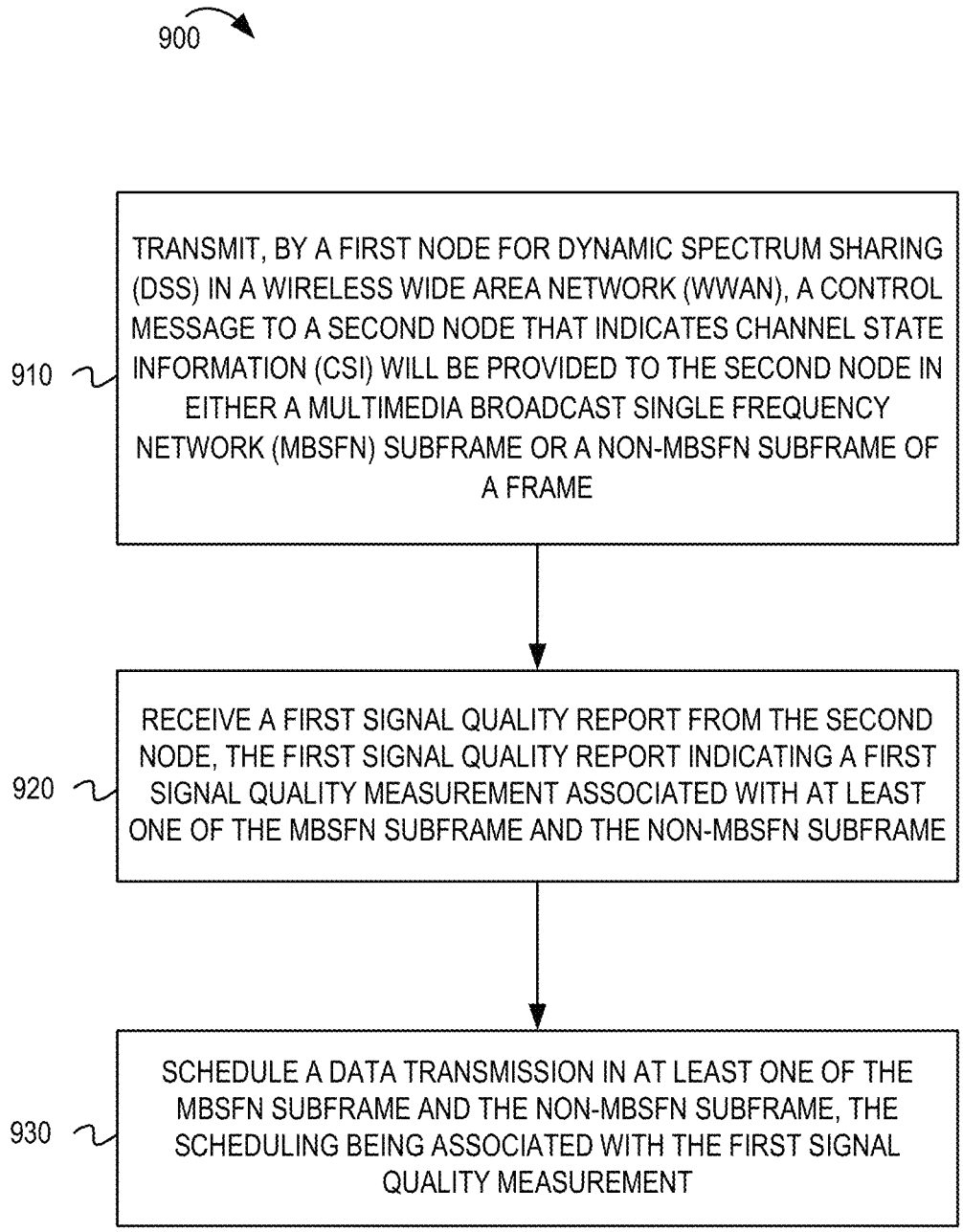
FIG. 9 depicts a flowchart with example operations performed by a first node of a wireless communication network for implementing a CSI measurement and reporting protocol for DSS in a wireless communication network.

The stored program codes, when executed by the controller/processor 280 or other processors and modules at UE 120, may cause the UE 120 to perform operations described with respect to the process depicted by flowchart 700 of FIG. 7, the process depicted by flowchart 800 of FIG. 8, the process depicted by flowchart 900 of FIG. 9 or other processes as described herein, such as the processes described in FIGS. 3-6. The stored program codes, when executed by the controller/processor 240 or other processors and modules at BS 110, may cause the BS 110 to perform operations described with respect to the process depicted by flowchart 700 of FIG. 7, the process depicted by flowchart 800 of FIG. 8, the process depicted by flowchart 900 of FIG. 9 or other processes as described herein, such as the processes described in FIGS. 3-6. A scheduler 246 may schedule UEs for data transmission on the downlink, the uplink, or a combination thereof.

In some aspects, UE 120 may include means for performing the process depicted by flowchart 700 of FIG. 7, the process depicted by flowchart 800 of FIG. 8, the process depicted by flowchart 900 of FIG. 9 or other processes as described herein, such as the processes described in FIGS. 3-6. In some aspects, such means may include one or more components of UE 120 described in connection with FIG. 2.

In some aspects, BS 110 may include means for performing the process depicted by flowchart 700 of FIG. 7, the process depicted by flowchart 800 of FIG. 8, the process depicted by flowchart 900 of FIG. 9 or other processes as described herein, such as the processes described in FIGS. 3-6. In some aspects, such means may include one or more components of BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
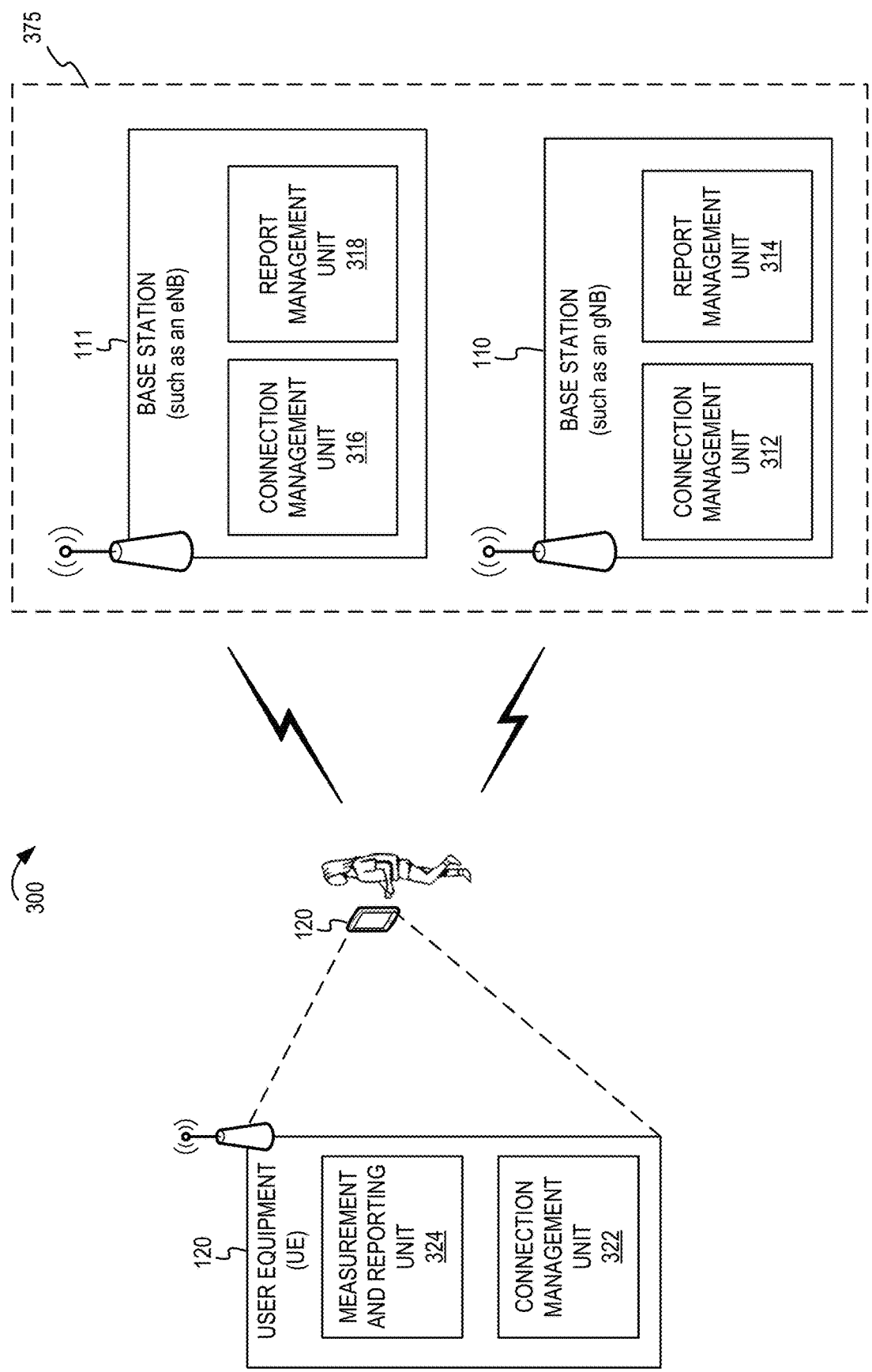
FIG. 3 shows a system diagram of an example wireless communication network including a BS and a UE that are configured to implement a channel state information (CSI) measurement and reporting protocol for dynamic spectrum sharing (DSS) in a wireless communication network.

FIG. 3 shows a system diagram of an example wireless communication network including a BS and a UE that are configured to implement a CSI measurement and reporting protocol for DSS in a wireless communication network. The wireless communication network 300 shown in FIG. 3 is based on the example wireless communication network 100 described in FIG. 1. The wireless communication network 300 also may be referred to as a wide area network (WAN) or a wireless wide area network (WWAN). The wireless communication network 300 may include one or more nodes or network entities, such as a UE 120, a BS 110, and a BS 111. The BS 110 and the BS 111 may have an MR-DC architecture 375 and may be configured to operate in an MR-DC mode. The MR-DC mode may be an EN-DC mode, which also may be referred to as LTE-NR DC mode. As shown in FIG. 3, in some implementations, the BS 110 may be a gNB that may implement a 5G NR RAT and the BS 111 may be an eNB that may implement an LTE RAT, and the BS 110 and the BS 111 may be configured to operate in an EN-DC mode and implement DSS. In some implementations, the BS 110 and the BS 111 may have a standalone (SA) architecture and may be configured to operate in an SA mode. The UE 120 may be an example implementation of the UEs shown in FIGS. 1 and 2. The BS 110 and the BS 111 may each be an example implementation of the BSs shown in FIGS. 1 and 2. Although not shown for simplicity, BSs may refer to both monolithic BSs, as well as disaggregated BSs, such as those with disaggregated RAN (D-RAN) or open RAN (O-RAN) architectures, which may include one or more disaggregated constituent components, such as a central unit (CU), distributed unit (DU), and a radio unit (RU). Furthermore, the wireless communication system 300 may include one or more additional BSs and one or more additional UEs.

In some implementations, the BS 110 may be an example of a node or a network entity of the wireless communication network 300. The BS 110 may include a communication management unit 312 and a report management unit 314. The communication management unit 312 may generate and transmit control messages ((such as an RRC message or an A-CSI request message) to the UE 120 in order to configure the UE 120 to implement a CSI measurement and reporting protocol for DSS. The report management unit 314 may process signal quality reports received from the UE 120. For example, the report management unit 314 may decode the received signal quality reports to determine or identify the signal quality measurements associated with MBSFN subframes, non-MBSFN subframes, or both. The communication management unit 312 may work in conjunction with the report management unit 314 to schedule data transmissions in MBSFN subframes, non-MBSFN subframes, or both MBSFN and non-MBSFN subframes based on the signal quality measurements included in the signal quality reports, as further described herein. In some implementations, the BS 111 also may include a connection management unit 316 and a report management unit 318. Although not shown in FIG. 3 for simplicity, in some implementations, a node or a network entity of the wireless communication network 300, such as the BS 110, may include multiple disaggregated constituent components, such as a CU, DU, and RU.

In some implementations, the UE 120 may be an example of a node of the wireless communication network 300. The UE 120 also may be referred to as a wireless communication device. The UE 120 may include a communication management unit 322 and a measurement and reporting unit 324. The communication management unit 322 may receive and process control messages (such as an RRC message or an A-CSI request message) from the BS 110 that configure the UE 120 to implement a CSI measurement and reporting protocol for DSS. The measurement and reporting unit 324 may perform signal quality measurements and generate signal quality reports (such as CSI reports) for transmission to the BS 110, as further described herein.

In some implementations, the BS 110 may provide control messages to the UE 120 to configure the UE 120 to perform signal quality measurements periodically or aperiodically or both. For example, the BS 110 may provide an RRC message or an RRC reconfiguration message to configure the UE 120 to perform a signal quality measurement periodically. The BS 110 may provide an aperiodic report request message to the UE 120 to configure the UE 120 to perform a signal quality measurement aperiodically. For example, the aperiodic report request message may be referred to as an aperiodic CSI (A-CSI) request message or an PDCCH A-CSI request message. The control messages may indicate whether the BS 110 will transmit signal quality reference information in one or more MBSFN subframes of a frame or in one or more non-MBSFN subframes of a frame. The non-MBSFN subframes of a frame may include subframes of a PDSCH or other data transmissions. The signal quality reference information may include CSI. The UE 120 may use the signal quality reference information (such as CSI) to perform the signal quality measurements. The UE 120 also may perform signal quality measurements on a data transmission (such as data included in a PDSCH), as further described herein.

In some implementations, the BS 110 may provide a control message to the UE 120 that indicates whether the CSI (which also may be referred to as CSI signals) will be provided to the UE 120 via one or more MBSFN subframes of a frame or via one or more non-MBSFN subframes of the frame. The control message may be an RRC message or an RRC reconfiguration message. The CSI may include CSI-RS or CSI-IM or both. In some implementations, the UE 120 may perform signal quality measurements associated with both the MBSFN subframes and the non-MBSFN subframes regardless of whether the CSI is included in the MBSFN subframes or in the non-MBSFN subframes. In some implementations, when the control message indicates the CSI will be provided to the UE 120 via an MBSFN subframe, the UE 120 may perform a first signal quality measurement on the CSI included in the MBSFN subframe, and the UE 120 may perform a second signal quality measurement on data included in the non-MBSFN subframe. For example, the first signal quality measurement may be performed on the CSI-RS. As another example, the first signal quality measurement may be performed on both the CSI-RS and the CSI-IM. The second signal quality measurement may be performed on data of a PDSCH. In some implementations, when the control message indicates the CSI will be provided to the UE 120 via a non-MBSFN subframe, the UE 120 may perform a first signal quality measurement on the CSI included in the non-MBSFN subframe, and the UE 120 may perform a second signal quality measurement on data included in the MBSFN subframe. As an example, each of the first and second signal quality measurements may be a channel quality indicator (CQI). As another example, each of the first and second signal quality measurements may be a CQI and an IM.

In some implementations, the UE 120 may generate and transmit a signal quality report associated with at least one of the first signal quality measurements and the second signal quality measurements. For example, the UE 120 may generate a signal quality report based on the first signal quality measurements or the second signal quality measurements or both. In some implementations, when the UE 120 receives a control message (such as an RRC message) that configures the UE 120 to perform periodic signal quality measurements, the UE 120 may generate a signal quality report based on both the first signal quality measurement and the second signal quality measurement. For example, the signal quality report may be a CSI report. In some implementations, the UE 120 may generate a signal quality report based on a third signal quality measurement that is associated with the first signal quality measurements and the second signal quality measurements. For example, the UE may calculate the third signal quality measurement using the first signal quality measurements and the second signal quality measurements.

In some implementations, the UE 120 may determine or identify that a first percentage of the frame received from the BS 110 are MBSFN subframes and a second percentage of the frame are non-MBSFN subframes. For example, the UE 120 may determine or identify that 20% of the frame are MBSFN subframes and 80% of the frame are non-MBSFN subframes. The first signal quality measurement is associated with the MBSFN subframes since the first signal quality measurement was measured using the MBSFN subframes. The second signal quality measurement is associated with the non-MBSFN subframes since the second signal quality measurement was measured using the non-MBSFN subframes. In some implementations, to calculate the third signal quality measurement, the UE 120 may weigh the first signal quality measurement according to the first percentage, and weigh the second signal quality measurement according to the second percentage. For example, if the first signal quality measurement is a CQI of 15, the first percentage is 20%, the second signal quality measurement is a CQI of 10, and the second percentage is 80%, the UE 120 may calculate a third signal quality measurement having a CQI of 11 based on the weighted first signal quality measurement and the weighted second signal quality measurement. The UE 120 may transmit a signal quality report (such as a CSI report) to the BS 110 that includes the third signal quality measurement that was calculated using the first and second signal quality measurements. The UE 120 may transmit one or more additional signal quality reports periodically to the BS 110 that include the third signal quality measurement. For example, if the third signal quality measurement is a CQI of 11, the UE 120 may periodically transmit a signal quality reports that include a CQI of 11. The UE 120 may transmit each signal quality report periodically every time interval or time period. For example, a reporting occasion (or reporting opportunity) for the UE 120 to transmit a signal quality report may be configured every time interval or time period in order to periodically transmit a signal quality report to the BS 110. As one example, the time interval or time period may be 20 time slots, which may correspond to 20 milliseconds (ms). As another example, the time interval or time period may be 40 time slots, which may correspond to 40 ms. In some implementations, the signal quality report may be periodic based on the BLER or based on the signal quality reporting in the MBSFN and non-MBSFN subframes. The signal quality reports that are transmitted periodically also may be referred to as periodic signal quality reports or periodic CSI (P-CSI) reports.

In some implementations, when the UE 120 receives a control message (such as an RRC message) that configures the UE 120 to perform periodic signal quality measurements, the UE 120 may generate a signal quality report (such as a CSI report) associated with either the first signal quality measurement or the second signal quality measurement. For example, the UE 120 may generate a first signal quality report that include the first signal quality measurements associated with an MBSFN subframe and generate a second signal quality report that includes the second signal quality measurements associated with a non-MBSFN subframe.

In some implementations, the UE 120 may determine or identify that a first percentage of the frame received from the BS 110 are MBSFN subframes and a second percentage of the frame are non-MBSFN subframes. For example, the UE 120 may determine or identify that 20% of the frame are MBSFN subframes and 80% of the frame are non-MBSFN subframes. Since the first signal quality measurement is associated with the MBSFN subframes and the first percentage of the frame are MBSFN subframes, the UE 120 may transmit a first signal quality report (such as a CSI report) that includes the first signal quality measurement. In some implementations, the UE 120 also may determine how many signal quality reports to transmit that include the first signal quality measurement based on the percentage associated with the MBSFN subframes and the number of reporting occasions or opportunities. For example, if the first percentage associated with the MBSFN subframes is 20%, the UE 120 may transmit one signal quality report including the first signal quality measurement for every 5 reporting occasions, two signal quality reports including the first signal quality measurement for every 10 reporting occasions, and so on. Furthermore, since the second signal quality measurement is associated with the non-MBSFN subframes and the second percentage of the frame are non-MBSFN subframes, the UE 120 may transmit a second signal quality report that includes the second signal quality measurement. In some implementations, the UE 120 also may determine how many signal quality reports to transmit that include the second signal quality measurement based on the percentage associated with the non-MBSFN subframes and the number of reporting occasions or opportunities. For example, if the second percentage associated with the non-MBSFN subframes is 80%, the UE 120 may transmit four signal quality reports including the second signal quality measurement for every 5 reporting occasions, eight signal quality reports including the second signal quality measurement for every 10 reporting occasions, and so on. Thus, in the example described herein, the UE 120 may transmit one signal quality report including the first signal quality measurement and four signal quality reports including the second signal quality measurement for every 5 reporting occasions. A reporting occasion (or reporting opportunity) for the UE 120 to transmit a signal quality report may be configured every time interval or time period in order to periodically transmit a signal quality report to the BS 110.

In some implementations, when the BS 110 transmits an aperiodic report request message (such as an A-CSI request message) to the UE 120 to configure the UE 120 to perform a signal quality measurement aperiodically, the aperiodic report request message may indicate whether the BS 110 will transmit signal quality reference information (such as CSI) in one or more MBSFN subframes of a frame or in one or more non-MBSFN subframes of a frame. For example, the aperiodic report request message may include an indication (such as one or more bits) that indicates whether the CSI will be included in an MBSFN subframe or in a non-MBSFN subframe. After receiving the aperiodic report request message from the BS 110, the UE 120 may perform a signal quality measurement on either an MBSFN subframe of a frame or a non-MBSFN subframe of the frame. For example, if the aperiodic report request message indicates the CSI will be transmitted via an MBSFN subframe, the UE 120 may perform the signal quality measurement using the CSI included in the MBSFN subframe. If the aperiodic report request message indicates the CSI will be transmitted via a non-MBSFN subframe, the UE 120 may perform the signal quality measurement using the CSI included in the non-MBSFN subframe. After performing the signal quality measurement, the UE 120 may generate and transmit a signal quality report that includes the signal quality measurement. In some implementations, the aperiodic report request message also may indicate a time slot in which to transmit the signal quality report (which also may be referred to as an aperiodic signal quality report or an aperiodic CSI (A-CSI) report). The UE 120 may identify the time slot from the aperiodic report request message and transmit the signal quality report to the BS 110 during the time slot.

In some implementations, the BS 110 may receive a periodic signal quality report (such as a P-CSI report) or an aperiodic signal quality report (such as an A-CSI report) from the UE 120. When the BS 110 receives a periodic signal quality report, the BS 110 may determine or identify the signal quality measurement (such as CQI) that is included in the periodic signal quality report. As described herein, in some implementations, the received periodic signal quality report may include a third signal quality measurement that is calculated using the first signal quality measurement and the second signal quality measurement. In some implementations, the received signal quality report may include the first signal quality measurement associated with the MBSFN subframes or the second signal quality measurement associated with the non-MBSFN subframes. In some implementations, the signal quality reports may be CSI reports. The CSI reports may include CSI feedback (CSF), and the CSF may include the signal quality measurement (such as a CQI). In some implementations, the BS 110 may use the first signal quality measurement to schedule data in MBSFN subframes, and may use the second signal quality measurement to schedule data in non-MBSFN subframes. For example, the BS 110 may use the first signal quality measurement to schedule a data transmission (such as data via an NR PDSCH) in the MBSFN subframes, and may use the second signal quality measurement to schedule a data transmission (such as a data via an NR PDSCH) in the non-MBSFN subframes. In some implementations, the third signal quality measurement (that is calculated using the first signal quality measurement and the second signal quality measurement) may be used to schedule data in either MBSFN subframes or non-MBSFN subframes. When the BS 110 receives an aperiodic signal quality report, the BS 110 may determine or identify the signal quality measurement that is included in the aperiodic signal quality report. The signal quality measurement may either be associated with the MBSFN subframes or the non-MBSFN subframes, depending on the control message (such as the A-CSI request) that was provided to the UE 120 by the BS 110. In some implementations, the BS 110 may use the signal quality measurement included in the aperiodic signal quality report to schedule data in either a MBSFN subframe or a non-MBSFN subframe.

Figure 4:
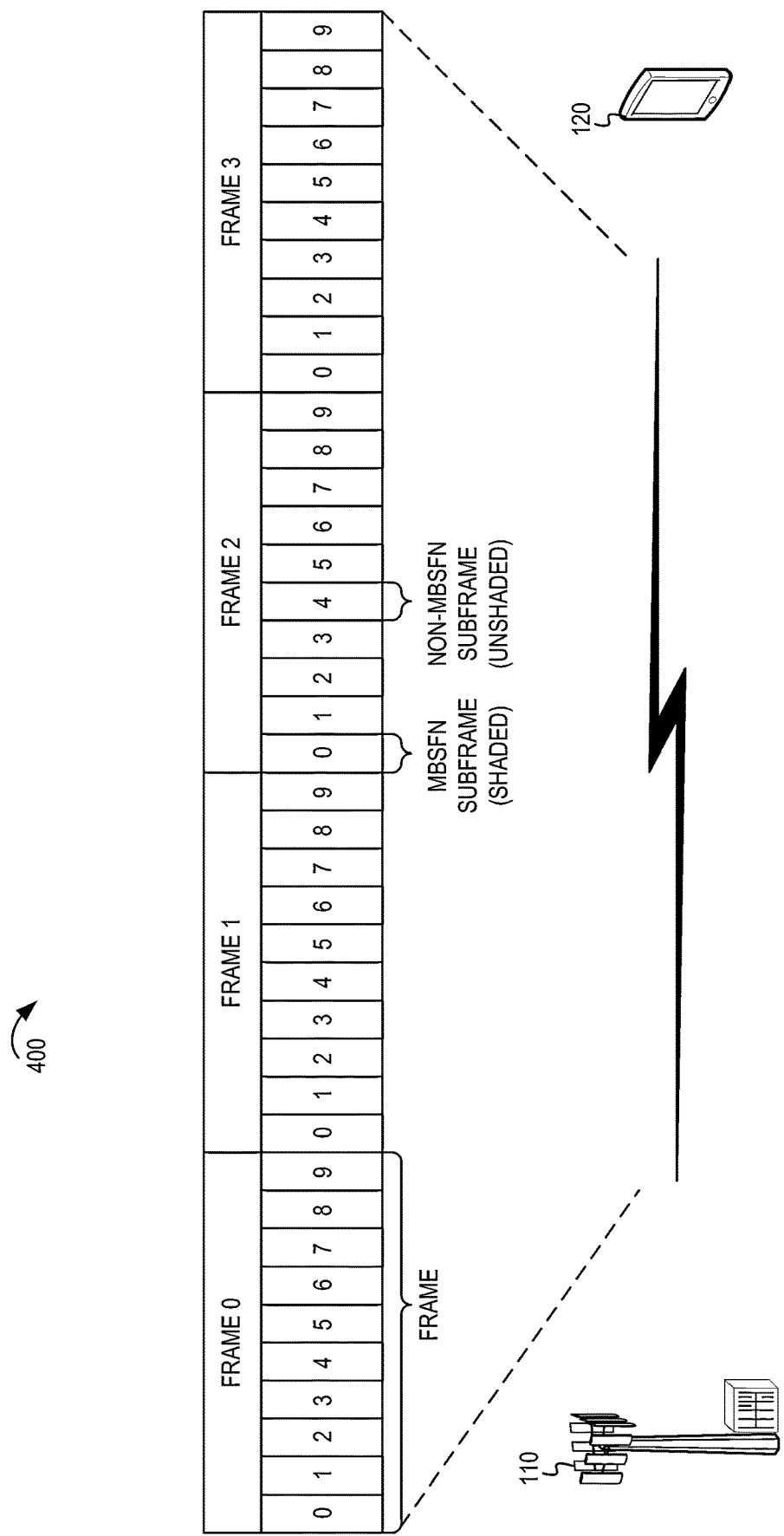
FIG. 4 shows a conceptual diagram of frames that include MBSFN and non-MBSFN subframes that are transmitted from a BS to a UE and may be used to implement a CSI measurement and reporting protocol for DSS.

FIG. 4 shows a conceptual diagram 400 of frames that include MBSFN and non-MBSFN subframes that are transmitted from a BS to a UE and may be used to implement a CSI measurement and reporting protocol for DSS. FIG. 4 includes nodes or network entities of a wireless communication network, such as the BS 110 and the UE 120 that are described in FIGS. 1-3.

The BS 110 may generate and transmit one or more frames and each frame may include multiple subframes. For example, each frame may include both MBSFN subframes and non-MBSFN subframes or each frame may include only non-MBSFN subframes. In the example shown in FIG. 4, the BS 110, or a component of the BS, may generate and transmit four frames, such as frame 0, frame 1, frame 2, and frame 3. Each frame may include ten subframes, such as subframes 0-9. In FIG. 4, the shaded subframes represent the MBSFN subframes and the unshaded subframes represent the non-MBSFN subframes. For example, subframes 0-1 of frame 0 may be MBSFN subframes and subframes 2-9 of frame 0 may be non-MBSFN subframes. Subframes 0-9 of frame 1 may be non-MBSFN subframes. Subframe 0 of frame 2 may be an MBSFN subframe and subframes 1-9 of frame 2 may be non-MBSFN subframes. Subframes 0-9 of frame 3 may be non-MBSFN subframes.

In some implementations, when the UE 120 receives a control message (such as an RRC message) that configures the UE 120 to perform periodic signal quality measurements and the UE 120 receives a frame (such as frame 0), the UE 120 may generate a signal quality report using a first signal quality measurement associated with an MBSFN subframe (such as subframe 1 of frame 0), or using a second signal quality measurement associated with a non-MBSFN subframe (such as subframe 5 of frame 0), or using both the first signal quality measurement and the second signal quality measurement. The UE 120 may determine or identify that a first percentage of the frame (such as the frame 0) are MBSFN subframes and a second percentage of the frame are non-MBSFN subframes. For example, the UE 120 may determine or identify that 20% of the frame 0 are MBSFN subframes (subframes 0-1) and 80% of the frame 0 are non-MBSFN subframes (subframes 2-9). As described in FIG. 3, in some implementations, the UE 120 may generate a signal quality report that includes a third signal quality measurement that is calculated from both a weighted first signal quality measurement (which is weighted based on the 20%) and a weighted second signal quality measurement (which is weighted based on the 80%). In some implementations, the UE 120 may generate a first signal quality report that includes the first signal quality measurement and a second signal quality report that includes the second signal quality measurement.

In some implementations, when the UE 120 receives a control message (such as an A-CSI request) that configures the UE 120 to perform an aperiodic signal quality measurement and indicates whether an MBSFN subframe or a non-MBSFN subframe of a frame includes the CSI, the UE 120 may generate a signal quality report using either a first signal quality measurement associated with the MBSFN subframe (such as subframe 0 of frame 2) or using a second signal quality measurement associated with the non-MBSFN subframe (such as subframe 6 of frame 2) depending on which subframe includes the CSI. As described herein, in some implementations, if the BS 110 transmits the CSI to the UE 120 via the MBSFN subframe (such as subframe 0 of frame 2), the UE 120 may generate and transmit a signal quality report using the first signal quality measurement associated with the MBSFN subframe. If the BS 110 transmits the CSI to the UE 120 via the non-MBSFN subframe (such as subframe 6 of frame 2), the UE 120 may generate and transmit a signal quality report using the second signal quality measurement associated with the non-MBSFN subframe.

FIG. 5 shows an example message flow that shows periodic signaling from a BS to a UE to implement a CSI measurement and reporting protocol for DSS in a wireless communication network. The message flow diagram 500 includes network nodes or network entities, such as the BS 110 and the UE 120 that are described in FIGS. 1-3. The signaling shown in the message flow diagram 500 may be used to implement CSI measurements and reporting periodically.

At 510, the BS 110 may generate and transmit a control message to configure the UE 120 to perform signal quality measurements and provide a signal quality report periodically. For example, the control message may be an RRC message or an RRC reconfiguration message and may be referred to as a periodic control message. The control message may include an indication (such as one or more bits) that indicates whether the CSI will be provided to the UE 120 via one or more MBSFN subframes of a frame or via one or more non-MBSFN subframes of the frame, as described in FIG. 3. The CSI may include CSI-RS or CSI-IM or both.

At 520, the UE 110 may receive the control message (such as an RRC message) from the BS 110 and process the control message. For example, the UE 120 may decode the control message to identify or determine the indication that indicates whether the CSI will be provided to the UE 120 via an MBSFN subframe of a frame or via a non-MBSFN subframe of the frame.

At 530, the BS 110 may transmit one or more frames to the UE 120 associated with the periodic control message (such as the RRC message). For example, the BS 110 may transmit a first frame (such as frame 0 shown in FIG. 4) to the UE 120 that includes MBSFN subframes and non-MBSFN subframes. The BS 110 may include the CSI in either an MBSFN subframe or a non-MBSFN subframe of the first frame (as indicated by the control message).

At 540, the UE 120 may receive the one or more frames and may perform signal quality measurements on one or more subframes of the one or more frames. For example, the UE 120 may receive a first frame and may perform a first signal quality measurement on an MBSFN subframe of the first frame and perform a second signal quality measurement on a non-MBSFN subframe of the first frame. Furthermore, in some implementations, the UE 120 may determine or identify that a first percentage (such as 20%) of the first frame are MBSFN subframes and a second percentage (such as 80%) of the first frame are non-MBSFN subframes. In some implementations, the UE 120 may generate a signal quality report that includes a third signal quality measurement that is calculated from both a weighted first signal quality measurement (which is weighted based on the first percentage, such as 20%) and a weighted second signal quality measurement (which is weighted based on the second percentage, such as 80%), as described in FIG. 3. In some implementations, the UE 120 may generate a first signal quality report that includes the first signal quality measurement and a second signal quality report that includes the second signal quality measurement, as described in FIG. 3.

At 550, the UE 120 may transmit one or more signal quality reports to the BS 110. In some implementations, the UE 120 may transmit a signal quality report periodically (such as every reporting occasion) that includes a third signal quality measurement that is calculated using the first signal quality measurement and the second signal quality measurement. In some implementations, the UE 120 may transmit a first signal quality report periodically that includes the first signal quality measurement and a second signal quality report periodically that includes the second signal quality measurement. For example, the first signal quality report may be transmitted periodically every fifth reporting occasion (which is determined based on the first percentage, such as 20%), and the second signal quality report may be transmitted periodically four times every five reporting occasions (which is determined based on the second percentage, such as 80%), as described in FIG. 3.

At 560, the BS 110 may receive the one or more signal quality reports from the UE 120 and may schedule data transmissions based on the signal quality measurements included in the one or more signal quality reports, as described in FIG. 3. For example, the BS 110 may schedule a data transmission in either an MBSFN subframe or a non-MBSFN subframe based on the third signal quality measurement that is calculated using the first signal quality measurement and the second signal quality measurement. As another example, the BS 110 may schedule a first data transmission on an MBSFN subframe based on the first signal quality measurement or on a non-MBSFN subframe based on the second signal quality measurement.

FIG. 6 shows an example message flow that shows aperiodic signaling from a BS to a UE to implement a CSI measurement and reporting protocol for DSS in a wireless communication network. The message flow diagram 600 includes network nodes or network entities, such as the BS 110 and the UE 120 that are described in FIGS. 1-3. The signaling shown in the message flow diagram 600 may be used to implement CSI measurements and reporting aperiodically.

At 610, the BS 110 may generate and transmit a control message to configure the UE 120 to perform signal quality measurements and provide a signal quality report aperiodically. For example, the control message may be an RRC message or an RRC reconfiguration message and may be referred to as an aperiodic control message. The control message may include an indication (such as one or more bits) that indicates whether the CSI will be provided to the UE 120 via an MBSFN subframe of a frame or via a non-MBSFN subframe of the frame, as described in FIG. 3. The CSI may include CSI-RS or CSI-IM or both. In some implementations, the BS 110 may provide one or more control messages to the UE 120 aperiodically to request the UE 120 to perform one or more signal quality measurements and transmit one or more signal quality report that are in addition to the periodic signal quality measurements and reports.

At 620, the UE 110 may receive the control message (such as an A-CSI request message) from the BS 110 and process the control message. For example, the UE 120 may decode the control message to identify or determine the indication that indicates whether the CSI will be provided to the UE 120 via an MBSFN subframe of a frame or via a non-MBSFN subframe of the frame.

At 630, the BS 110 may transmit a frames to the UE 120 associated with the aperiodic control message (such as the A-CSI request message). For example, the BS 110 may transmit a frame (such as frame 2 shown in FIG. 4) to the UE 120 that includes MBSFN subframes and non-MBSFN subframes. The BS 110 may include the CSI in either an MBSFN subframe or a non-MBSFN subframe of the frame (as indicated by the control message).

At 640, the UE 120 may receive a frame and may perform a signal quality measurement on a subframe of the received frame. For example, if the aperiodic control message received from the BS 110 indicated the CSI will be included in the MBSFN subframe, the UE 120 may receive the frame and may perform a signal quality measurement on the MBSFN subframe of the frame. If the aperiodic control message indicated the CSI will be included in the non-MBSFN subframe, the UE 120 may perform the signal quality measurement on the non-MBSFN subframe of the frame. In some implementations, the UE 120 may generate a signal quality report (which also may be referred to as an aperiodic signal quality report) that includes the signal quality measurement, as described in FIG. 3.

At 650, the UE 120 may transmit a signal quality report to the BS 110. In some implementations, the UE 120 may transmit a signal quality report aperiodically according to the received aperiodic control message, as described in FIG. 3. For example, the UE 120 may transmit the signal quality report aperiodically at a certain time slot or time instant indicated by the aperiodic control message.

At 660, the BS 110 may receive the signal quality report from the UE 120 and may schedule data transmissions based on the signal quality measurement included in the signal quality report, as described in FIG. 3. For example, the BS 110 may schedule a data transmission in either an MBSFN subframe or a non-MBSFN subframe based on the signal quality measurement.

FIG. 7 depicts a flowchart 700 with example operations performed by a first node of a wireless communication network for implementing a CSI measurement and reporting protocol for DSS in a wireless communication network. In some implementations, the first node may be a UE (such as UE 120 described in FIGS. 1-3) and the second node may be a BS (such as the BS 110 described in FIGS. 1-3) or a component of a BS, such as a CU, a DU, or an RU implemented in a D-RAN or O-RAN configuration.

At block 710, a first node may perform a first signal quality measurement associated with a MBSFN subframe of a frame received from a second node.

At block 720, the first node may perform a second signal quality measurement associated with a non-MBSFN subframe of the frame.

At block 730, the first node may transmit a first signal quality report associated with at least one of the first signal quality measurement and the second signal quality measurement to the second node.

FIG. 8 depicts a flowchart 800 with example operations performed by a first node of a wireless communication network for implementing a CSI measurement and reporting protocol for DSS in a wireless communication network. In some implementations, the first node may be a UE (such as UE 120 described in FIGS. 1-3) and the second node may be a BS (such as the BS 110 described in FIGS. 1-3) or a component of a BS, such as a CU, a DU, or an RU implemented in a D-RAN or O-RAN configuration.

At block 810, a first node may receive a CSI request message from a second node. The CSI request message may indicate CSI will be transmitted by the second node in either a MBSFN subframe or a non-MBSFN subframe of a frame.

At block 820, the first node may perform a signal quality measurement on the CSI included in the MBSFN subframe associated with the CSI request message indicating that the CSI will be transmitted in the MBSFN subframe. For example, in response to the CSI request message indicating that the CSI will be transmitted in the MBSFN subframe, the first may perform the signal quality measurement on the CSI included in the MBSFN subframe.

At block 830, the first node may perform the signal quality measurement on the CSI included in the non-MBSFN subframe associated with the CSI request message indicating that the CSI will be transmitted in the non-MBSFN subframe. For example, in response to the CSI request message indicating that the CSI will be transmitted in the non-MBSFN subframe, the first node may perform the signal quality measurement on the CSI included in the non-MBSFN subframe.

At block 840, the first node may transmit a signal quality report to the second node. The signal quality report may include the signal quality measurement.

FIG. 9 depicts a flowchart 900 with example operations performed by a first node of a wireless communication network for implementing a CSI measurement and reporting protocol for DSS in a wireless communication network. In some implementations, the first node may be a BS (such as the BS 110 described in FIGS. 1-3) or a component of a BS, such as a CU, a DU, or an RU implemented in a D-RAN or O-RAN configuration. The second node may be a UE (such as UE 120 described in FIGS. 1-3).

At block 910, a first node may transmit a control message to a second node that indicates CSI will be provided to the second node in either a MBSFN subframe or a non-MBSFN subframe of a frame.

At block 920, the first node may receive a first signal quality report from the second node. The first signal quality report may indicate a first signal quality measurement associated with at least one of the MBSFN subframe and the non-MBSFN subframe.

At block 930, the first node may schedule a data transmission in at least one of the MBSFN subframe and the non-MBSFN subframe. The scheduling may be associated with the first signal quality measurement.

Figure 10:
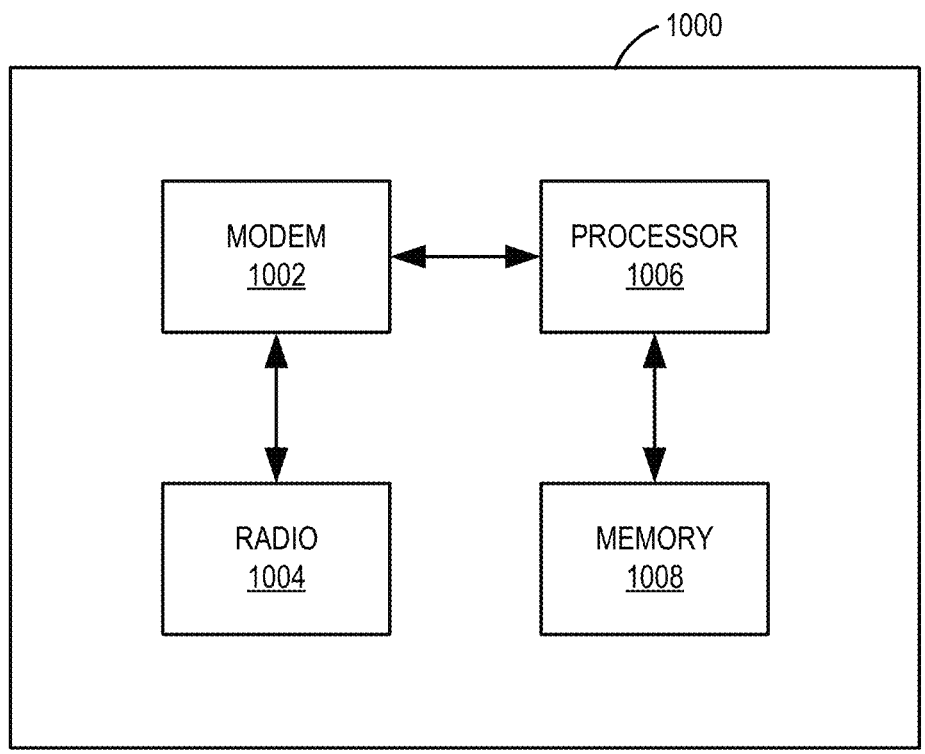
FIG. 10 shows a block diagram of an example wireless communication apparatus.

FIG. 10 shows a block diagram of an example wireless communication apparatus 1000. In some implementations, the wireless communication apparatus 1000 can be an example of a device for use in a UE, such as the UE 120 described with reference to FIG. 3. In some implementations, the wireless communication apparatus 1000 can be an example of a device for use in a BS, such as the BS 110 described with reference to FIG. 3. The wireless communication apparatus 1000 is capable of transmitting (or outputting for transmission) and receiving wireless communications.

The wireless communication apparatus 1000 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The wireless communication apparatus 1000 may include one or more modems 1002. In some implementations, the one or more modems 1002 (collectively "the modem 1002") may include a WWAN modem (for example, a 3GPP 4G LTE or 5G compliant modem). In some implementations, the wireless communication apparatus 1000 also includes one or more radios 1004 (collectively "the radio 1004"). In some implementations, the wireless communication apparatus 1000 further includes one or more processors, processing blocks or processing elements (collectively "the processor 1006") and one or more memory blocks or elements (collectively "the memory 1008").

The modem 1002 can include an intelligent hardware block or device such as, for example, an application-specific integrated circuit (ASIC) among other possibilities. The modem 1002 is generally configured to implement a PHY layer. For example, the modem 1002 is configured to modulate packets and to output the modulated packets to the radio 1004 for transmission over the wireless medium. The modem 1002 is similarly configured to obtain modulated packets received by the radio 1004 and to demodulate the packets to provide demodulated packets. In addition to a modulator and a demodulator, the modem 1002 may further include digital signal processing (DSP) circuitry, automatic gain control (AGC), a coder, a decoder, a multiplexer and a demultiplexer. For example, while in a transmission mode, data obtained from the processor 1006 is provided to a coder, which encodes the data to provide encoded bits. The encoded bits are mapped to points in a modulation constellation (using a selected MCS) to provide modulated symbols. The modulated symbols may be mapped to a number NSS of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 1004. In implementations involving beamforming, the modulated symbols in the respective spatial streams are precoded via a steering matrix prior to their provision to the IFFT block.

While in a reception mode, digital signals received from the radio 1004 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 1006) for processing, evaluation, or interpretation.

The radio 1004 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication apparatus 1000 can include, or be coupled with, multiple transmit antennas (each with a corresponding transmit chain) and multiple receive antennas (each with a corresponding receive chain). The symbols output from the modem 1002 are provided to the radio 1004, which transmits the symbols via the coupled antennas. Similarly, symbols received via the antennas are obtained by the radio 1004, which provides the symbols to the modem 1002.

The processor 1006 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1006 processes information received through the radio 1004 and the modem 1002, and processes information to be output through the modem 1002 and the radio 1004 for transmission through the wireless medium. In some implementations, the processor 1006 may generally control the modem 1002 to cause the modem to perform various operations described throughout.

The memory 1008 can include tangible storage media such as random-access memory (RAM) or read-only memory (ROM), or combinations thereof. The memory 1008 also can store non-transitory processor- or computer-executable software (SW) code containing instructions that, when executed by the processor 1006, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the processor 1006 and the memory 1008 of the wireless communication apparatus 1000 may be referred to as a processing system. A processing system may generally refer to a system or series of machines or components that receives inputs and processes the inputs to produce a set of outputs (which may be passed to other systems or components of, for example, one of the UEs 120 or one of the BSs 110). In some implementations, the processing system may include the processor 1006, the memory 1008, and one or more other components of the wireless communication apparatus 1000, such as the modem 1002.

In some implementations, the processing system of a UE 120 may interface with other components of the UE 120, and may process information received from other components (such as inputs or signals), output information to other components, etc. For example, a chip or modem of the UE 120 (such as the wireless communication apparatus 1000) may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the processing system of a BS 110 may interface with other components of the BS 110, and may process information received from other components (such as inputs or signals), output information to other components, etc. For example, a chip or modem of the BS 110 (such as the wireless communication apparatus 1000) may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

Figure 11:
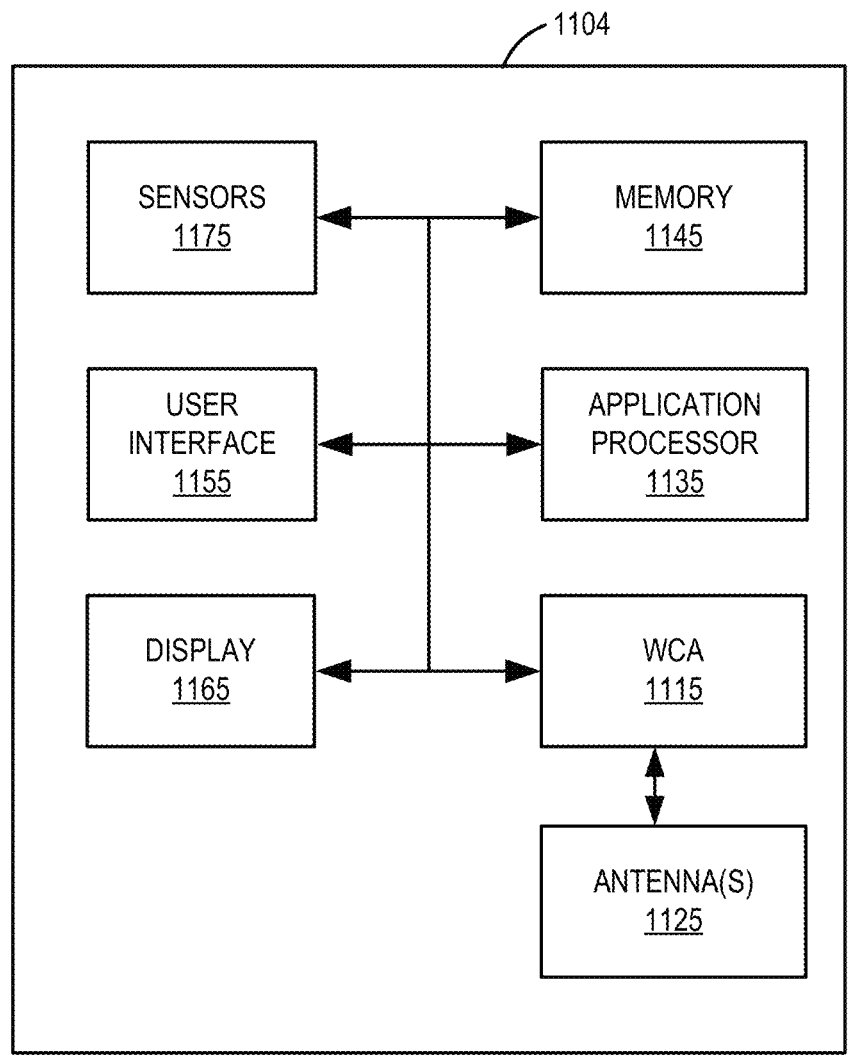
FIG. 11 shows a block diagram of an example mobile communication device.

FIG. 11 shows a block diagram of an example mobile communication device 1104. For example, the mobile communication device 1104 can be an example implementation of the UE 120 described herein. The mobile communication device 1104 includes a wireless communication apparatus (WCA) 1115. For example, the WCA 1115 may be an example implementation of the wireless communication apparatus 1000 described with reference to FIG. 10. The mobile communication device 1104 also includes one or more antennas 1125 coupled with the WCA 1115 to transmit and receive wireless communications. The mobile communication device 1104 additionally includes an application processor 1135 coupled with the WCA 1115, and a memory 1145 coupled with the application processor 1135. In some implementations, the mobile communication device 1104 further includes a UI 1155 (such as a touchscreen or keypad) and a display 1165, which may be integrated with the UI 1155 to form a touchscreen display. In some implementations, the mobile communication device 1104 may further include one or more sensors 1175 such as, for example, one or more inertial sensors, accelerometers, temperature sensors, pressure sensors, or altitude sensors. Ones of the aforementioned components can communicate with other ones of the components directly or indirectly, over at least one bus. The mobile communication device 1104 further includes a housing that encompasses the WCA 1115, the application processor 1135, the memory 1145, and at least portions of the antennas 1125, UI 1155, and display 1165.

FIGS. 1-11 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

Clause 1. One aspect of the subject matter described in this disclosure can be implemented in a method for DSS in a WWAN performed by a first node. The method may include performing a first signal quality measurement associated with an MBSFN subframe of a frame received from a second node, performing a second signal quality measurement associated with a non-MBSFN subframe of the frame, and transmitting a first signal quality report associated with at least one of the first signal quality measurement and the second signal quality measurement to the second node.

Clause 2. The method of clause 1, where the first signal quality report may be a CSI report, and performing the first signal quality measurement associated with the MBSFN subframe may include performing the first signal quality measurement on CSI included in the MBSFN subframe, or performing the first signal quality measurement on data included in the MBSFN subframe.

Clause 3. The method of any one or more of clauses 1-2, where performing the second signal quality measurement associated with the non-MBSFN subframe may include performing the second signal quality measurement on CSI included in the non-MBSFN subframe, or performing the second signal quality measurement on data included in the non-MBSFN subframe.

Clause 4. The method of any one or more of clauses 1-3, where the CSI may include at least one of a CSI-RS and a CSI-IM, and the data includes data of a PDSCH.

Clause 5. The method of any one or more of clauses 1-4, where transmitting the first signal quality report associated with at least one of the first signal quality measurement and the second signal quality measurement may include transmitting the first signal quality report that includes a third signal quality measurement that is calculated using the first signal quality measurement and the second signal quality measurement.

Clause 6. The method of any one or more of clauses 1-5, where transmitting the first signal quality report that includes the third signal quality measurement that is calculated using the first signal quality measurement and the second signal quality measurement may include identifying that a first percentage of the frame includes MBSFN subframes, the first signal quality measurement being associated with the MBSFN subframes, identifying that a second percentage of the frame includes non-MBSFN subframes, the second signal quality measurement being associated with the non-MBSFN subframes, weighing the first signal quality measurement according to the first percentage and the second signal quality measurement according to the second percentage, and calculating the third signal quality measurement using the weighted first signal quality measurement and the weighted second signal quality measurement.

Clause 7. The method of any one or more of clauses 1-6, where the method may further include transmitting the first signal quality report including the third signal quality measurement periodically according to a time interval.

Clause 8. The method of any one or more of clauses 1-7, where the method may further include generating the first signal quality report using the first signal quality measurement, and generating a second signal quality report using the second signal quality measurement, the first signal quality report indicating the first signal quality measurement associated with the MBSFN subframe and the second signal quality report indicating the second signal quality measurement associated with the non-MBSFN subframe. The method may further include transmitting the second signal quality report to the second node.

Clause 9. The method of any one or more of clauses 1-8, where the method may further include transmitting one or more additional signal quality reports including either the first signal quality measurement or the second signal quality measurement periodically according to a time interval.

Clause 10. The method of any one or more of clauses 1-9, where the method may further include receiving an RRC message from the second node, and performing the first signal quality measurement and the second signal quality measurement in response to receiving the RRC message from the second node.

Clause 11. Another aspect of the subject matter described in this disclosure can be implemented in a method for DSS in a WWAN performed by a first node. The method may include receiving a CSI request message from a second node, the CSI request message indicating CSI will be transmitted by the second node in either an MBSFN subframe or a non-MBSFN subframe of a frame. The method may include performing a signal quality measurement on the CSI included in the MBSFN subframe associated with the CSI request message indicating that the CSI will be transmitted in the MBSFN subframe, performing the signal quality measurement on the CSI included in the non-MBSFN subframe associated with the CSI request message indicating that the CSI will be transmitted in the non-MBSFN subframe, and transmitting a signal quality report to the second node, the signal quality report including the signal quality measurement.

Clause 12. The method of clause 11, where the CSI may include at least one of a CSI-RS and a CSI-IM.

Clause 13. The method of any one or more of clauses 11-12, where the CSI request message may be an A-CSI request message and the signal quality report may be an A-CSI signal quality report.

Clause 14. Another aspect of the subject matter described in this disclosure can be implemented in a method for DSS in a WWAN performed by a first node. The method may include transmitting a control message to a second node that indicates CSI will be provided to the second node in either an MBSFN subframe or a non-MBSFN subframe of a frame, and receiving a first signal quality report from the second node, the first signal quality report indicating a first signal quality measurement associated with at least one of the MBSFN subframe and the non-MBSFN subframe. The method may include scheduling a data transmission in at least one of the MBSFN subframe and the non-MBSFN subframe, the scheduling being associated with the first signal quality measurement.

Clause 15. The method of clause 14, where receiving the first signal quality report indicating the first signal quality measurement associated with at least one of the MBSFN subframe and the non-MBSFN subframe may include receiving the first signal quality report indicating the first signal quality measurement that is calculated using a second signal quality measurement associated with the MBSFN subframe and a third signal quality measurement associated with the non-MBSFN subframe.

Clause 16. The method of any one or more of clauses 14-15, where scheduling the data transmission in at least one of the MBSFN subframe and the non-MBSFN subframe may include at least one of scheduling a first data transmission in the MBSFN subframe, the scheduling being associated with the first signal quality measurement, and scheduling a second data transmission in the non-MBSFN subframe, the scheduling being associated with the first signal quality measurement.

Clause 17. The method of any one or more of clauses 14-16, where the first signal quality measurement may be calculated by the second node using a weighted second signal quality measurement associated with the MBSFN subframe and a weighted third signal quality measurement associated with the non-MBSFN subframe.

Clause 18. The method of any one or more of clauses 14-17, where the method may further include receiving the first signal quality report indicating the first signal quality measurement periodically according to a time interval.

Clause 19. The method of any one or more of clauses 14-18, where the first signal quality measurement may be associated with the MBSFN subframe, and the method may further include receiving a second signal quality report from the second node, the second signal quality report indicating a second signal quality measurement associated with the non-MBSFN subframe.

Clause 20. The method of any one or more of clauses 14-19, where scheduling the data transmission in at least one of the MBSFN subframe and the non-MBSFN subframe may include at least one of scheduling a first data transmission in the MBSFN subframe, the scheduling being associated with the first signal quality measurement associated with the MBSFN subframe, and scheduling a second data transmission in the non-MBSFN subframe, the scheduling being associated with the second signal quality measurement associated with the non-MBSFN subframe.

Clause 21. The method of any one or more of clauses 14-20, where the method may further include receiving the first signal quality report indicating the first signal quality measurement periodically according to a first time interval, and receiving the second signal quality report indicating the second signal quality measurement periodically according to a second time interval.

Clause 22. Another aspect of the subject matter described in this disclosure can be implemented in an apparatus of a first node configured to implement DSS in a WWAN. The apparatus may include one or more processors and one or more interfaces. The one or more processors may be configured to perform a first signal quality measurement associated with a MBSFN subframe of a frame received from a second node, and perform a second signal quality measurement associated with a non-MBSFN subframe of the frame. The one or more interfaces may be configured to transmit a first signal quality report associated with at least one of the first signal quality measurement and the second signal quality measurement to the second node.

Clause 23. The apparatus of clause 22, where the first signal quality report may be a CSI report, and the one or more processors configured to perform the first signal quality measurement associated with the MBSFN subframe may include the one or more processors configured to perform the first signal quality measurement on CSI included in the MBSFN subframe, or perform the first signal quality measurement on data included in the MBSFN subframe.

Clause 24. The apparatus of any one or more of clauses 22-23, where the one or more processors configured to perform the second signal quality measurement associated with the non-MBSFN subframe may include the one or more processors configured to perform the second signal quality measurement on CSI included in the non-MBSFN subframe, or perform the second signal quality measurement on data included in the non-MBSFN subframe.

Clause 25. The apparatus of any one or more of clauses 22-24, where the one or more interfaces configured to transmit the first signal quality report associated with at least one of the first signal quality measurement and the second signal quality measurement may include the one or more interfaces configured to transmit the first signal quality report that includes a third signal quality measurement that is calculated using the first signal quality measurement and the second signal quality measurement.

Clause 26. The apparatus of any one or more of clauses 22-25, where the one or more processors are further configured to identify that a first percentage of the frame includes MBSFN subframes, the first signal quality measurement being associated with the MBSFN subframes, identify that a second percentage of the frame includes non-MBSFN subframes, the second signal quality measurement being associated with the non-MBSFN subframes, weigh the first signal quality measurement according to the first percentage and the second signal quality measurement according to the second percentage, and calculate the third signal quality measurement using the weighted first signal quality measurement and the weighted second signal quality measurement.

Clause 27. The apparatus of any one or more of clauses 22-26, where the one or more interfaces are further configured to transmit the first signal quality report including the third signal quality measurement periodically according to a time interval.

Clause 28. The apparatus of any one or more of clauses 22-27, where the one or more processors are further configured to generate the first signal quality report using the first signal quality measurement, and generate a second signal quality report using the second signal quality measurement, the first signal quality report indicating the first signal quality measurement associated with the MBSFN subframe and the second signal quality report indicating the second signal quality measurement associated with the non-MBSFN subframe. The one or more interfaces are further configured to transmit the second signal quality report to the second node.

Clause 29. The apparatus of any one or more of clauses 22-28, where the one or more interfaces are further configured to transmit one or more additional signal quality reports including either the first signal quality measurement or the second signal quality measurement periodically according to a time interval.

Clause 30. The apparatus of any one or more of clauses 22-29, where the one or more interfaces are further configured to receive a RRC message from the second node, and the one or more processors are further configured to perform the first signal quality measurement and the second signal quality measurement in response to reception of the RRC message from the second node.

Clause 31. Another aspect of the subject matter described in this disclosure can be implemented in an apparatus of a first node configured to implement DSS in a WWAN. The apparatus may include one or more processors and one or more interfaces. The one or more interfaces may be configured to receive a CSI request message from a second node, the CSI request message indicating CSI will be transmitted by the second node in either a MBSFN subframe or a non-MBSFN subframe of a frame. The one or more processors may be configured to perform a signal quality measurement on the CSI included in the MBSFN subframe associated with the CSI request message indicating that the CSI will be transmitted in the MBSFN subframe, and perform the signal quality measurement on the CSI included in the non-MBSFN subframe associated with the CSI request message indicating that the CSI will be transmitted in the non-MBSFN subframe. The one or more interfaces may be configured to transmit a signal quality report to the second node, the signal quality report including the signal quality measurement.

Clause 32. The apparatus of clause 31, where the CSI includes at least one of a CSI-RS and a CSI-IM.

Clause 33. The apparatus of any one or more of clauses 31-32, where the CSI request message is an A-CSI request message and the signal quality report is an A-CSI signal quality report.

Clause 34. Another aspect of the subject matter described in this disclosure can be implemented in an apparatus of a first node configured to implement DSS in a WWAN. The apparatus may include one or more processors and one or more interfaces. The one or more interfaces may be configured to transmit a control message to a second node that indicates CSI will be provided to the second node in either a MBSFN subframe or a non-MBSFN subframe of a frame, and receive a first signal quality report from the second node, the first signal quality report indicating a first signal quality measurement associated with at least one of the MBSFN subframe and the non-MBSFN subframe. The one or more processors may be configured to schedule a data transmission in at least one of the MBSFN subframe and the non-MBSFN subframe, the schedule of the data transmission being associated with the first signal quality measurement.

Clause 35. The apparatus of clause 34, where the one or more interfaces configured to receive the first signal quality report indicating the first signal quality measurement associated with at least one of the MBSFN subframe and the non-MBSFN subframe may include the one or more interfaces configured to receive the first signal quality report indicating the first signal quality measurement that is calculated using a second signal quality measurement associated with the MBSFN subframe and a third signal quality measurement associated with the non-MBSFN subframe.

Clause 36. The apparatus of any one or more of clauses 34-35, where the one or more processors configured to schedule the data transmission in at least one of the MBSFN subframe and the non-MBSFN subframe may include at least one of the one or more processors configured to schedule a first data transmission in the MBSFN subframe, the schedule of the first data transmission being associated with the first signal quality measurement, and the one or more processors configured to schedule a second data transmission in the non-MBSFN subframe, the schedule of the second data transmission being associated with the first signal quality measurement.

Clause 37. The apparatus of any one or more of clauses 34-36, where the first signal quality measurement is associated with the MBSFN subframe, and the one or more interfaces are further configured to receive a second signal quality report from the second node, the second signal quality report indicating a second signal quality measurement associated with the non-MBSFN subframe.

Clause 38. The apparatus of any one or more of clauses 34-37, where the one or more processors configured to schedule the data transmission in at least one of the MBSFN subframe and the non-MBSFN subframe may include at least one of the one or more processors configured to schedule a first data transmission in the MBSFN subframe, the schedule of the first data transmission being associated with the first signal quality measurement associated with the MBSFN subframe, and the one or more processors configured to schedule a second data transmission in the non-MBSFN subframe, the schedule of the second data transmission being associated with the second signal quality measurement associated with the non-MBSFN subframe.

Another aspect of the subject matter described in this disclosure can be implemented as a non-transitory computer-readable medium having stored therein instructions which, when executed by one or more processors of a node, cause the node to perform any one of the above-mentioned methods or features described herein.

Another aspect of the subject matter described in this disclosure can be implemented as an apparatus having means for implementing any one of the above-mentioned methods or features described herein.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram.

However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for dynamic spectrum sharing (DSS) in a wireless wide area network (WWAN) performed by a first node, comprising:
performing a first signal quality measurement associated with a first subframe of a frame received from a second node, wherein the first subframe is associated with a first subframe type;
performing a second signal quality measurement associated with a second subframe of the frame, wherein the second subframe is associated with a second subframe type;
identifying that a first percentage of the frame includes subframes of the first subframe type, wherein the first signal quality measurement is associated with the subframes of the first subframe type;
identifying that a second percentage of the frame includes subframes of the second subframe type, wherein the second signal quality measurement is associated with the subframes of the second subframe type;
weighing the first signal quality measurement according to the first percentage and the second signal quality measurement according to the second percentage;
calculating a third signal quality measurement using the weighted first signal quality measurement and the weighted second signal quality measurement; and
transmitting, to the second node, a first signal quality report associated with at least one of the first signal quality measurement and the second signal quality measurement and including the third signal quality measurement that is calculated using the weighted first signal quality measurement and the weighted second signal quality measurement.

2. The method of claim 1, wherein the first signal quality report is a channel state information (CSI) report, and performing the first signal quality measurement associated with the first subframe includes:
performing the first signal quality measurement on CSI reference signals (CSI-RSs) included in the first subframe, or
performing the first signal quality measurement on data included in the first subframe.

3. The method of claim 2, wherein:
the data includes data of a Physical Downlink Shared Channel (PDSCH).

4. The method of claim 1, wherein performing the second signal quality measurement associated with the second subframe includes:
performing the second signal quality measurement on channel state information (CSI) reference signals (CSI-RSs) included in the second subframe, or
performing the second signal quality measurement on data included in the second subframe.

5. The method of claim 4, wherein:
the data includes data of a Physical Downlink Shared Channel (PDSCH).

6. The method of claim 4, wherein the first signal quality report is a CSI report.

7. The method of claim 1, wherein transmitting the first signal quality report including the third signal quality measurement comprises:
transmitting the first signal quality report including the third signal quality measurement periodically according to a time interval.

8. The method of claim 1, further comprising:
generating one or more additional signal quality reports;
indicating either the first signal quality measurement or the second signal quality measurement; and
transmitting the one or more additional signal quality reports to the second node.

9. The method of claim 8, wherein transmitting the one or more additional signal quality reports comprises:
transmitting the one or more additional signal quality reports periodically according to a time interval.

10. The method of claim 1, further comprising:
receiving a radio resource control (RRC) message from the second node; and
performing the first signal quality measurement and the second signal quality measurement based on receiving the RRC message from the second node.

11. The method of claim 1, wherein the first subframe type is a multimedia broadcast single frequency network (MBSFN) subframe type and the second subframe type is a non-MBSFN subframe type.

12. A method for dynamic spectrum sharing (DSS) in a wireless wide area network (WWAN) performed by a first node, comprising:
transmitting, to a second node, a control message that indicates one of a first subframe of a frame or a second subframe of the frame in which one or more channel state information (CSI) reference signals (CSI-RSs) are to be provided to the second node, wherein the first subframe is associated with a first subframe type and the second subframe is associated with a second subframe type;
receiving a first signal quality report from the second node, the first signal quality report indicating a third signal quality measurement that is a combination of a first signal quality measurement weighted by a percentage of the frame that includes subframes of the first subframe type and a second signal quality measurement weighted by a percentage of the frame that includes subframes of the second subframe type; and
scheduling a data transmission in at least one of the first subframe and the second subframe, the scheduling being associated with the third signal quality measurement.

13. The method of claim 12, wherein scheduling the data transmission in at least one of the first subframe and the second subframe includes at least one of:
scheduling a first data transmission in the first subframe, the scheduling being associated with the first signal quality measurement; and
scheduling a second data transmission in the second subframe, the scheduling being associated with the second signal quality measurement.

14. The method of claim 13, wherein the first signal quality report further indicates at least one of the first signal quality measurement and the second signal quality measurement.

15. The method of claim 12, wherein receiving the first signal quality report indicating the third signal quality measurement comprises:
receiving the first signal quality report indicating the third signal quality measurement periodically according to a time interval.

16. The method of claim 12, wherein the first subframe type is a multimedia broadcast single frequency network (MBSFN) subframe type and the second subframe type is a non-MBSFN subframe type.

17. An apparatus of a first node configured to implement dynamic spectrum sharing (DSS) in a wireless wide area network (WWAN), the apparatus comprising:
one or more processors;
one or more memories coupled with the one or more processors; and
one or more processor-readable instructions stored in the one or more memories and executable by the one or more processors individually or collectively to cause the apparatus to:
perform a first signal quality measurement associated with a first subframe of a frame received from a second node, and perform a second signal quality measurement associated with a second subframe of the frame, wherein the first subframe is associated with a first subframe type and the second subframe is associated with a second subframe type;
identify that a first percentage of the frame includes subframes of the first subframe type, wherein the first signal quality measurement is associated with the subframes of the first subframe type;
identify that a second percentage of the frame includes subframes of the second subframe type, wherein the second signal quality measurement is associated with the subframes of the second subframe type;
weigh the first signal quality measurement according to the first percentage and the second signal quality measurement according to the second percentage;
calculate a third signal quality measurement using the weighted first signal quality measurement and the weighted second signal quality measurement; and
transmit, to the second node, a first signal quality report associated with at least one of the first signal quality measurement and the second signal quality measurement, and including the third signal quality measurement that is calculated using the weighted first signal quality measurement and the weighted second signal quality measurement.

18. The apparatus of claim 17, wherein the first signal quality report is a channel state information (CSI) report, and wherein, to perform the first signal quality measurement associated with the first subframe, the one or more processor-readable instructions are executable by the one or more processors individually or collectively to cause the apparatus to:
perform the first signal quality measurement on CSI reference signals (CSI-RSs) included in the first subframe, or
perform the first signal quality measurement on data included in the first subframe.

19. The apparatus of claim 18, wherein the data includes data of a Physical Downlink Shared Channel (PDSCH).

20. The apparatus of claim 17, wherein, to perform the second signal quality measurement associated with the second subframe, the one or more processor-readable instructions are executable by the one or more processors individually or collectively to cause the apparatus to:
perform the second signal quality measurement on channel state information (CSI) reference signals (CSI-RSs) included in the second subframe, or
perform the second signal quality measurement on data included in the second subframe.

21. The apparatus of claim 20, wherein the first signal quality report is a CSI report.

22. The apparatus of claim 20, wherein the data includes data of a Physical Downlink Shared Channel (PDSCH).

23. The apparatus of claim 17, wherein, to transmit the first signal quality report including the third signal quality measurement, the one or more processor-readable instructions are executable by the one or more processors individually or collectively to cause the apparatus to:
transmit the first signal quality report including the third signal quality measurement periodically according to a time interval.

24. The apparatus of claim 17, wherein the one or more processor-readable instructions are further executable by the one or more processors individually or collectively to cause the apparatus to:
generate one or more additional signal quality reports; indicating either the first signal quality measurement or the second signal quality measurement; and
transmit the one or more additional signal quality reports to the second node.

25. The apparatus of claim 24, wherein, to transmit the one or more additional signal quality reports, the one or more processor-readable instructions are executable by the one or more processors individually or collectively to cause the apparatus to:
transmit the one or more additional signal quality reports periodically according to a time interval.

26. The apparatus of claim 17, wherein the one or more processor-readable instructions are further executable by the one or more processors individually or collectively to cause the apparatus to:
receive a radio resource control (RRC) message from the second node; and
perform the first signal quality measurement and the second signal quality measurement based on reception of the RRC message from the second node.

27. The apparatus of claim 17, wherein the first subframe type is a multimedia broadcast single frequency network (MBSFN) subframe type and the second subframe type is a non-MBSFN subframe type.

28. An apparatus of a first node configured to implement dynamic spectrum sharing (DSS) in a wireless wide area network (WWAN), the apparatus comprising:
one or more processors;
one or more memories coupled with the one or more processors; and
one or more processor-readable instructions stored in the one or more memories and executable by the one or more processors individually or collectively to cause the apparatus to:
transmit, to a second node, a control message that indicates one of a first subframe of a frame or a second subframe of the frame in which one or more channel state information (CSI) reference signals (CSI-RSs) are to be provided to the second node, wherein the first subframe is associated with a first subframe type and the second subframe is associated with a second subframe type;

receive, from the second node, a first signal quality report indicating a third signal quality measurement that is a combination of a first signal quality measurement weighted by a percentage of the frame that includes subframes of the first subframe type and a second signal quality measurement weighted by a percentage of the frame that includes subframes of the second subframe type; and schedule a data transmission in at least one of the first subframe and the second subframe, the scheduled data transmission being associated with the third signal quality measurement.

29. The apparatus of claim 28, wherein, to schedule the data transmission in at least one of the first subframe and the second subframe, the one or more memories are executable by the one or more processors individually or collectively to cause the apparatus to:

schedule a first data transmission in the first subframe, the scheduled first transmission being associated with the first signal quality measurement; and schedule a second data transmission in the second subframe, the scheduled second transmission being associated with the second signal quality measurement, wherein the first signal quality report further indicates at least one of the first signal quality measurement and the second signal quality measurement.

30. The apparatus of claim 28, wherein, to receive the first signal quality report indicating the third signal quality measurement, the one or more processor-readable instructions are executable by the one or more processors individually or collectively to cause the apparatus to:

receive the first signal quality report indicating the third signal quality measurement periodically according to a time interval.

\* \* \* \* \*